(12) United States Patent
Fox

(10) Patent No.: US 11,653,638 B2
(45) Date of Patent: May 23, 2023

(54) KNOTLESS COUPLER ARRANGEMENTS FOR ATTACHING FISHING IMPLEMENTS TO FISHING LINES

(71) Applicant: William D. Fox, New Richmond, OH (US)

(72) Inventor: William D. Fox, New Richmond, OH (US)

(73) Assignee: William D. Fox, New Richmond, OH (US)

( * ) Notice: Subject to any disclaimer, the term of this patent is extended or adjusted under 35 U.S.C. 154(b) by 990 days.

(21) Appl. No.: 16/406,681

(22) Filed: May 8, 2019

(65) Prior Publication Data

US 2020/0128804 A1  Apr. 30, 2020

Related U.S. Application Data

(60) Provisional application No. 62/817,772, filed on Mar. 13, 2019, provisional application No. 62/807,411, (Continued)

(51) Int. Cl.
*A01K 85/00*  (2006.01)
*F16B 2/00*  (2006.01)
(Continued)

(52) U.S. Cl.
CPC .............. *A01K 85/00* (2013.01); *F16B 2/005* (2013.01); *F16B 2/06* (2013.01); *F16B 2/185* (2013.01)

(58) Field of Classification Search
CPC ........ A01K 85/00; A01K 91/04; A01K 91/03; A01K 85/16; A01K 85/18; A01K 91/047;
(Continued)

(56) References Cited

U.S. PATENT DOCUMENTS 1,010,301 A * 11/1911 Neats ...................... F16G 11/10
403/291
1,023,706 A *  4/1912 Anderson ............... F16G 11/00
24/136 L
(Continued)

FOREIGN PATENT DOCUMENTS

CA         2089586 A1      8/1994
KR      200324227    *    8/2003
(Continued)

OTHER PUBLICATIONS

National Hardware, N232-967 ⅜ by 7 inch Zinc Plated Steel J Bolt, https://www.hardwareandtools.com/national-hardware-n232-967-3-8-by-7-inch-zinc-plated-steel-j-bolt-cgea-7029.html.

*Primary Examiner* — Timothy D Collins
*Assistant Examiner* — Maria E Graber

(57) ABSTRACT

A knotless coupler for securing a fishing line to a fishing implement is disclosed. The knotless coupler comprises a shaft portion and a nut. The shaft portion is configured to be attached to the fishing implement. The shaft portion comprises a plurality of external threads and an external line-receiving groove formed across at least some of the external threads. The nut is configured to be threadably engaged with the external threads of the shaft portion. The nut is movable between a non-gripping position and a line-gripping position. A portion of the fishing line is inserted through an opening in the nut and into the external line-receiving groove when the nut is in the non-gripping position. The portion of the fishing line is secured within the external line-receiving groove by the nut when the nut is in the line-gripping position.

17 Claims, 29 Drawing Sheets

Related U.S. Application Data filed on Feb. 19, 2019, provisional application No. 62/750,359, filed on Oct. 25, 2018.

(51) Int. Cl.
  *F16B 2/06* (2006.01)
  *F16B 2/18* (2006.01)

(58) Field of Classification Search
  CPC ............ A01K 85/1803; A01K 85/1867; A01K 85/1843; A01K 85/1851; F16B 2/005; F16B 2/06; F16B 2/185; F16B 2/065; F16B 29/00
  USPC ............ 43/43.1, 42.49, 42.36, 42.47, 44.83, 43/44.87, 44.92, 44.93
  See application file for complete search history.

(56) References Cited

U.S. PATENT DOCUMENTS

| | | | | |
|---|---|---|---|---|
| 1,710,102 | A * | 4/1929 | Pelton | A01K 85/10 43/42.48 |
| 1,842,591 | A * | 1/1932 | Dunkelberger | A01K 85/16 43/42.22 |
| 1,863,125 | A * | 6/1932 | Powell | A01K 85/16 43/42.49 |
| 1,977,141 | A * | 10/1934 | Pflueger | A01K 85/16 43/42.39 |
| 2,062,245 | A * | 11/1936 | Arens | A01K 91/04 70/456 R |
| 2,202,519 | A * | 5/1940 | Ferris | A01K 85/16 43/42.49 |
| 2,236,215 | A * | 3/1941 | Klinitski | A01K 93/02 43/17 |
| 2,241,767 | A * | 5/1941 | Cullerton | A01K 85/16 59/95 |
| 2,255,793 | A * | 9/1941 | Kridler | A01K 83/00 43/44.92 |
| 2,307,200 | A * | 1/1943 | Cullerton | A01K 85/16 43/42.49 |
| 2,465,064 | A * | 3/1949 | Colosimo | A01K 85/16 43/42.34 |
| 2,552,248 | A * | 5/1951 | Zavod | A01K 91/04 403/182 |
| 2,593,220 | A * | 4/1952 | Thompson | A01K 85/16 43/44.83 |
| 2,763,087 | A * | 9/1956 | Schnitzer | A01K 85/16 43/44.6 |
| 2,890,510 | A * | 6/1959 | Spalding | A01K 87/00 |
| 2,968,886 | A * | 1/1961 | Cotroumpas | A01K 85/16 43/44.99 |
| 3,091,885 | A * | 6/1963 | Ulsh | A01K 85/00 43/43.12 |
| 3,105,318 | A * | 10/1963 | Birrell | A01K 93/00 43/44.87 |
| 3,108,390 | A * | 10/1963 | Knight | A01K 85/16 43/42.22 |
| 3,293,792 | A * | 12/1966 | Bittaker, Jr. | A01K 95/00 43/44.89 |
| 3,589,053 | A * | 6/1971 | Fynbo | A01K 93/00 43/44.92 |
| 3,878,637 | A | 4/1975 | Flower | |
| 3,898,760 | A * | 8/1975 | Klein | A01K 91/04 24/129 R |
| 4,182,067 | A * | 1/1980 | Pfister | A01K 85/16 43/42.3 |
| 4,300,303 | A * | 11/1981 | Hutson | A01K 87/00 43/43.1 |
| 4,472,903 | A * | 9/1984 | Hutson | A01K 95/00 43/44.93 |
| 4,514,926 | A * | 5/1985 | Weber, Sr. | A01K 91/04 43/17.2 |
| 4,604,821 | A | 8/1986 | Moser | |
| 4,633,609 | A | 1/1987 | Brown | |
| 4,644,681 | A | 2/1987 | Hutson | |
| 4,667,437 | A * | 5/1987 | Dworski | A01K 91/04 43/42.36 |
| 4,777,757 | A | 10/1988 | de Marees van Swinderen | |
| 4,831,768 | A | 5/1989 | Sorace | |
| 4,864,767 | A * | 9/1989 | Drosdak | A01K 91/047 43/43.1 |
| 4,879,835 | A | 11/1989 | Sprayberry | |
| 5,081,785 | A | 1/1992 | Kahng | |
| 5,469,652 | A * | 11/1995 | Drosdak | A01K 91/16 59/95 |
| 5,666,760 | A | 9/1997 | Bramblett et al. | |
| 6,173,521 | B1 * | 1/2001 | Rockhill, Jr. | A01K 85/00 43/42.13 |
| 6,199,313 | B1 * | 3/2001 | Moore | A01K 85/01 43/42.31 |
| 6,260,241 | B1 | 7/2001 | Brennan | |
| 7,254,917 | B2 | 8/2007 | Brickett | |
| 7,510,220 | B1 | 3/2009 | Wood | |
| 7,621,069 | B2 | 11/2009 | Holtzhampf | |
| 8,146,286 | B2 | 4/2012 | Wood | |
| 8,402,687 | B1 | 3/2013 | Jarrell | |
| 8,484,884 | B2 | 7/2013 | Zuk | |
| 8,910,415 | B2 | 12/2014 | Farr | |
| 8,950,107 | B1 * | 2/2015 | Rosenbloom | A01K 95/02 43/44.87 |
| 9,301,514 | B2 | 4/2016 | Pearcy | |
| 9,370,174 | B2 * | 6/2016 | Farley | A01K 93/00 |
| 9,485,980 | B1 | 11/2016 | Latta | |
| 9,538,735 | B1 | 1/2017 | Rider | |
| 9,717,225 | B1 | 8/2017 | Rider | |
| 9,814,285 | B1 | 11/2017 | Rider | |
| 9,867,365 | B1 * | 1/2018 | Rosenbloom | A01K 91/03 |
| 10,136,626 | B1 | 11/2018 | Rider | |
| 11,109,580 | B1 * | 9/2021 | Rosenbloom | A01K 91/03 |
| 2003/0182844 | A1 | 10/2003 | Berthold | |
| 2004/0216362 | A1 | 11/2004 | Taylor | |
| 2005/0034356 | A1 | 2/2005 | Blette et al. | |
| 2006/0000138 | A1 * | 1/2006 | Druk | A01K 91/053 43/42.19 |
| 2006/0042147 | A1 * | 3/2006 | Jenkins | A01K 85/16 43/42.36 |
| 2007/0169399 | A1 | 7/2007 | More | |
| 2007/0199235 | A1 | 8/2007 | Yu | |
| 2012/0060404 | A1 * | 3/2012 | Baron | A01K 93/02 43/44.87 |
| 2014/0196355 | A1 | 7/2014 | Colucci | |
| 2014/0208630 | A1 * | 7/2014 | Pearcy | A01K 91/03 43/43.1 |
| 2016/0165868 | A1 * | 6/2016 | LeHew | A01K 85/00 43/42.74 |
| 2017/0150703 | A1 | 6/2017 | Fenton | |
| 2018/0235198 | A1 | 8/2018 | Bunner | |
| 2019/0014761 | A1 * | 1/2019 | Rosher | A01K 85/18 |

FOREIGN PATENT DOCUMENTS

| | | |
|---|---|---|
| KR | 200324227 Y1 | 8/2003 |
| KR | 200475997 Y1 | 1/2015 |

* cited by examiner

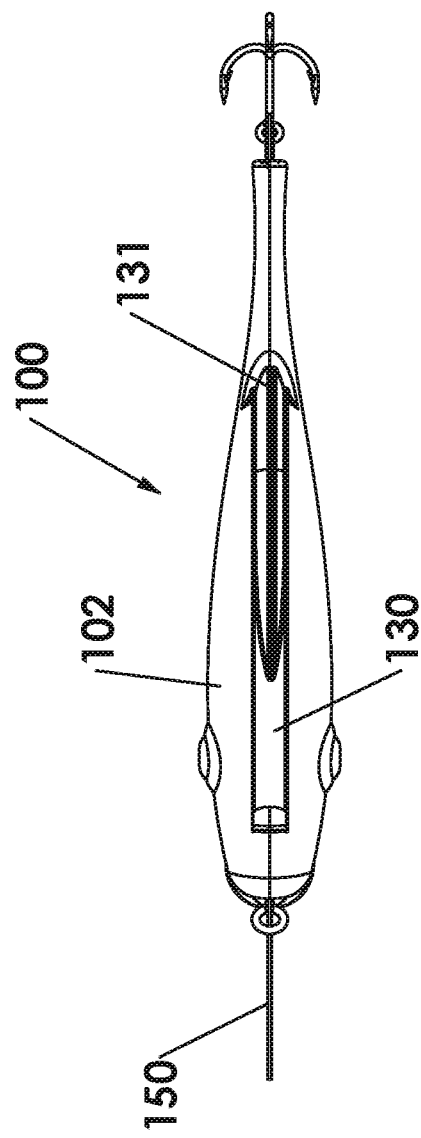
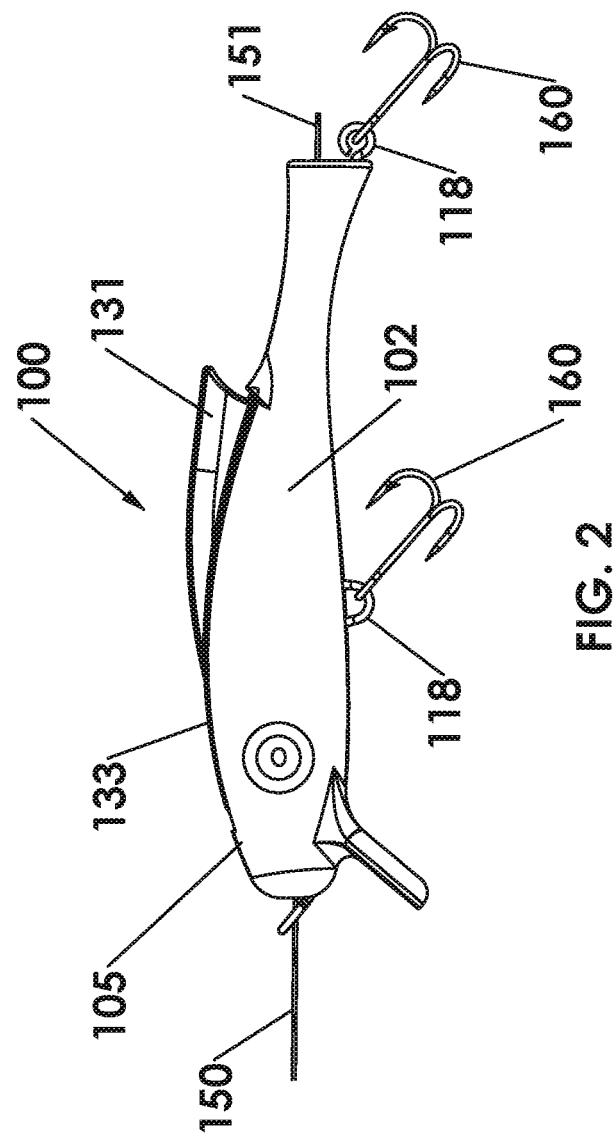

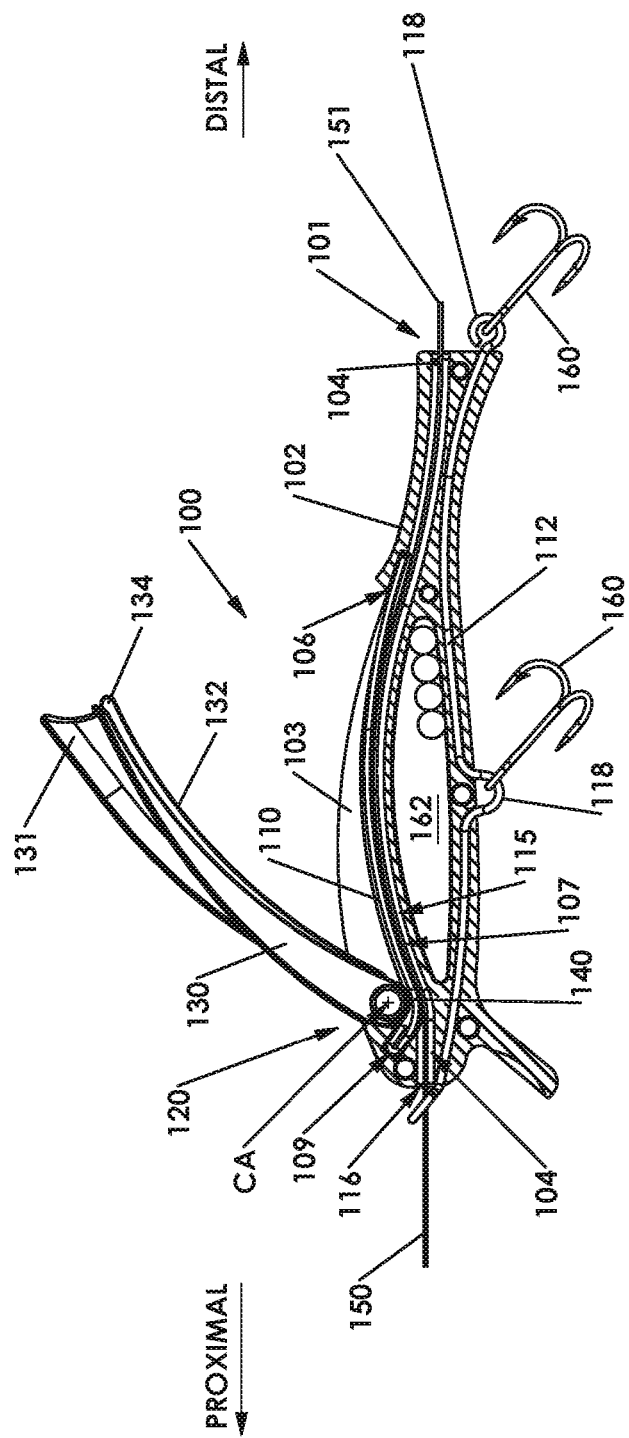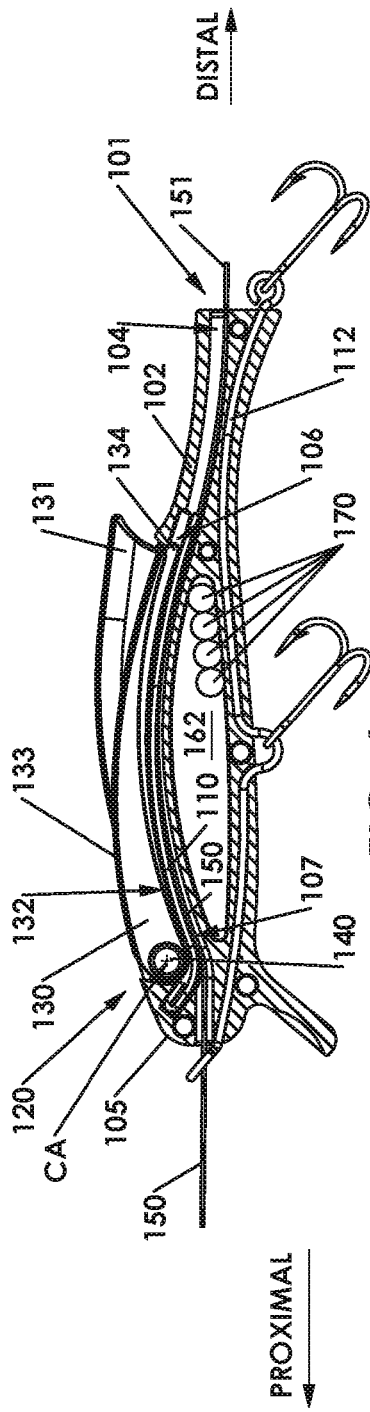

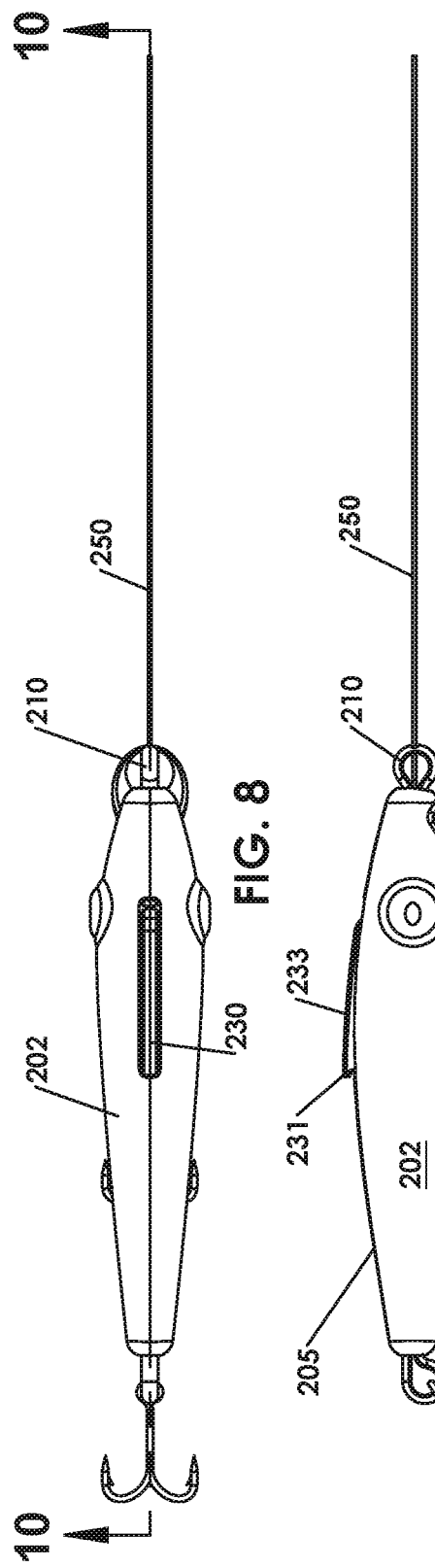
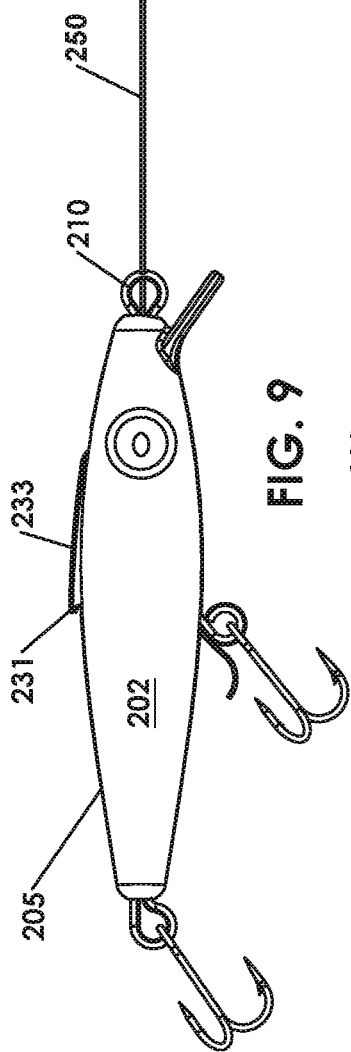
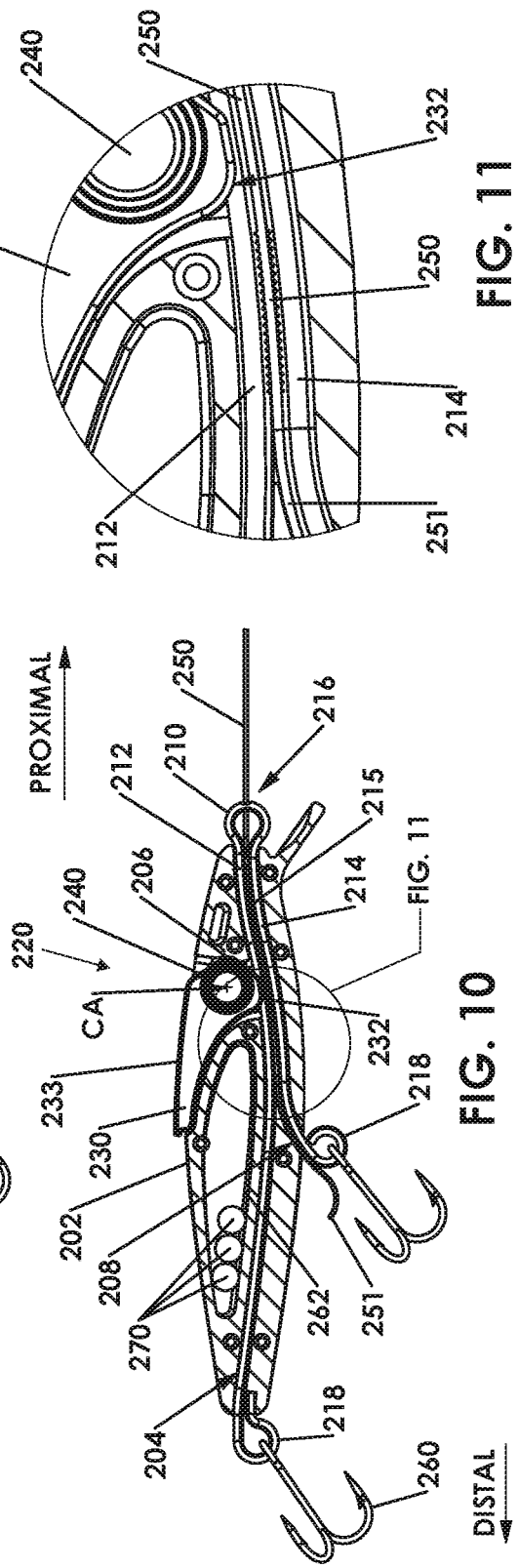
FIG. 8
FIG. 9
FIG. 10
FIG. 11

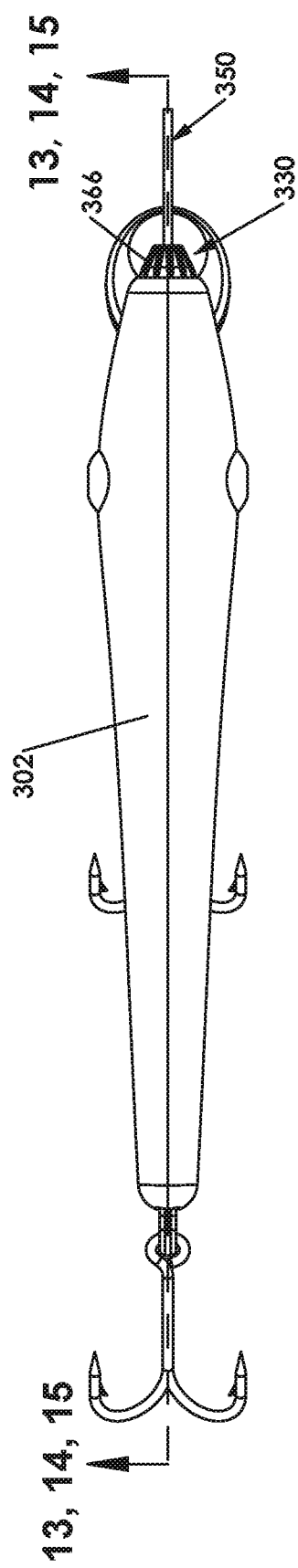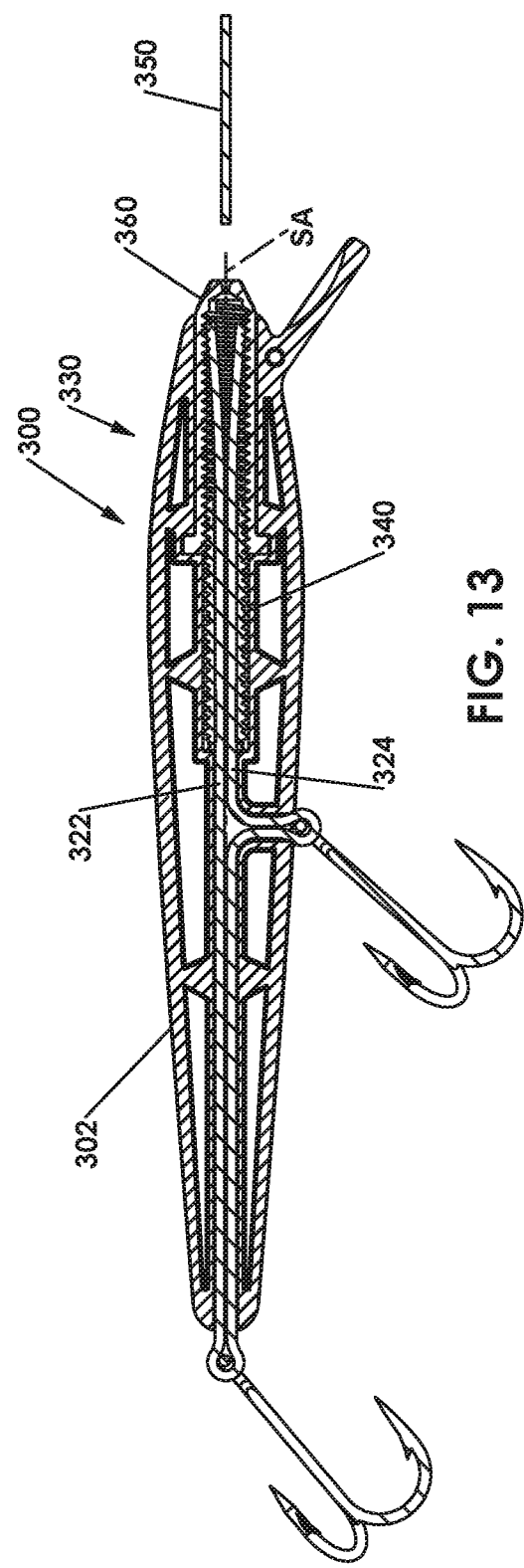
FIG. 12
FIG. 13

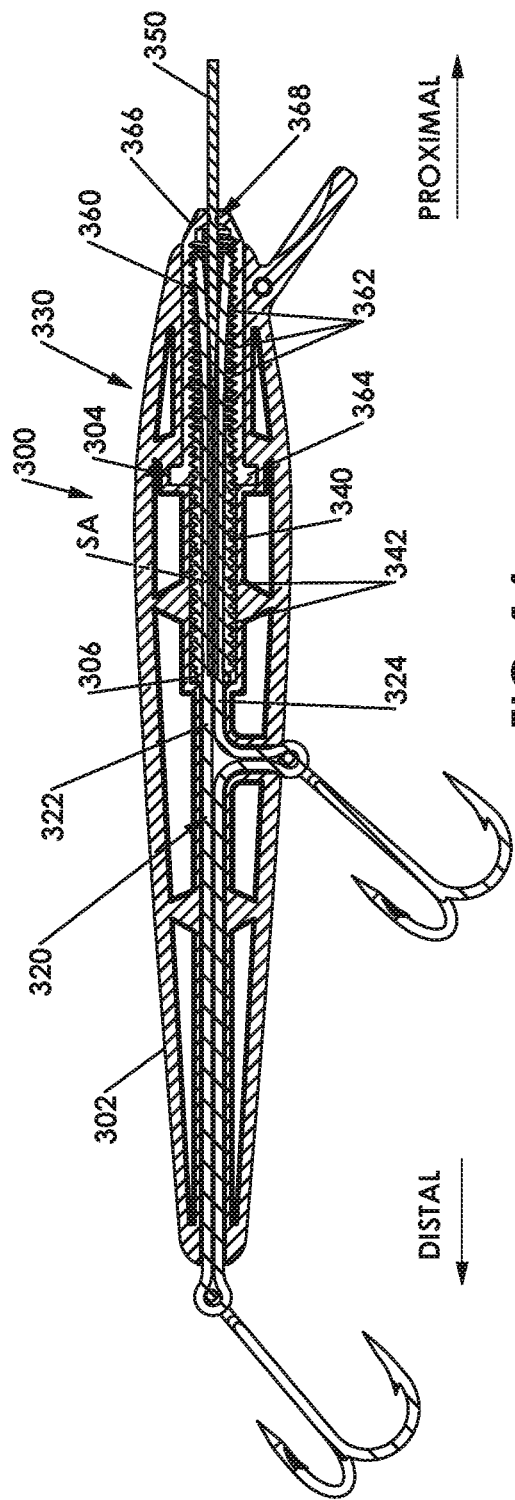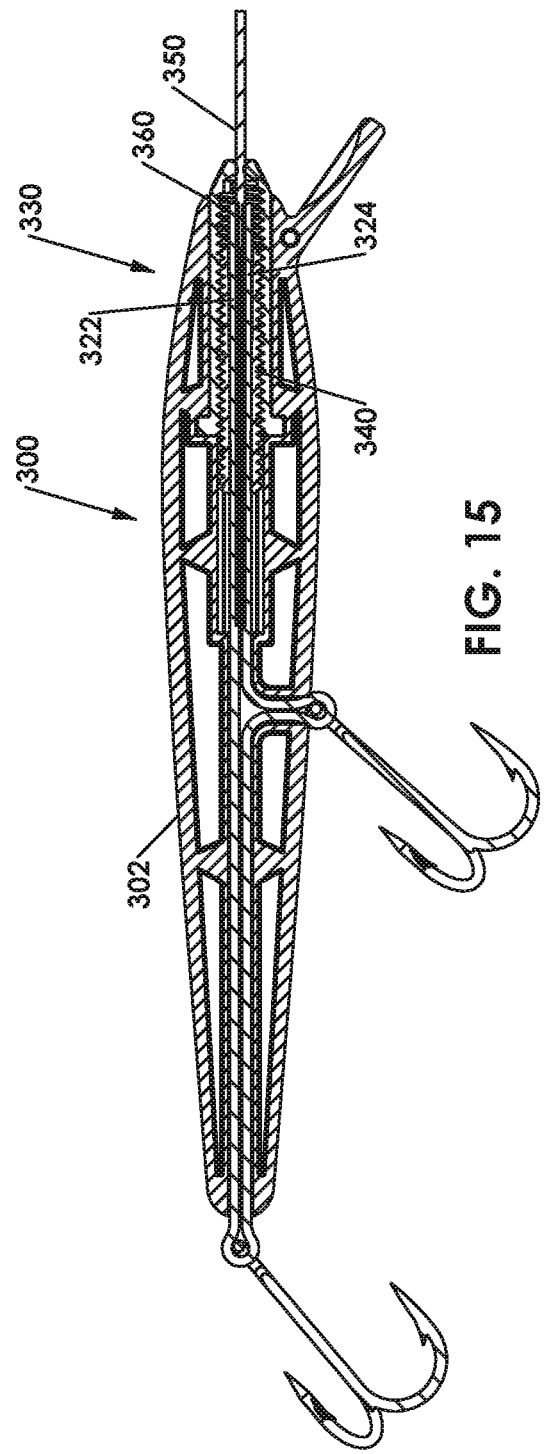

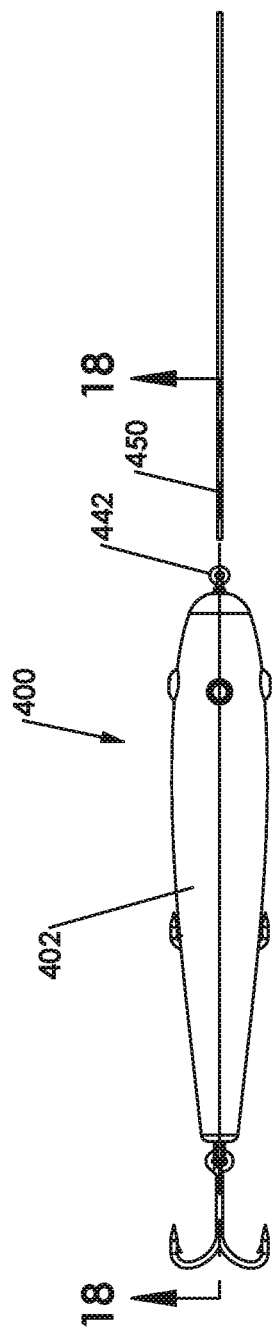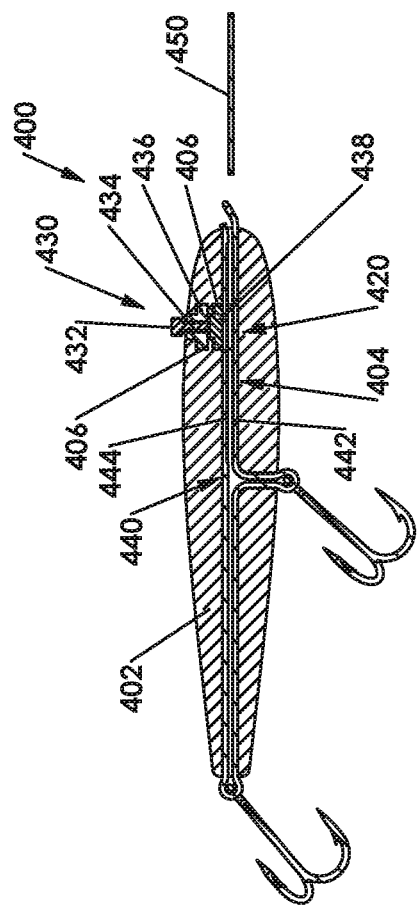

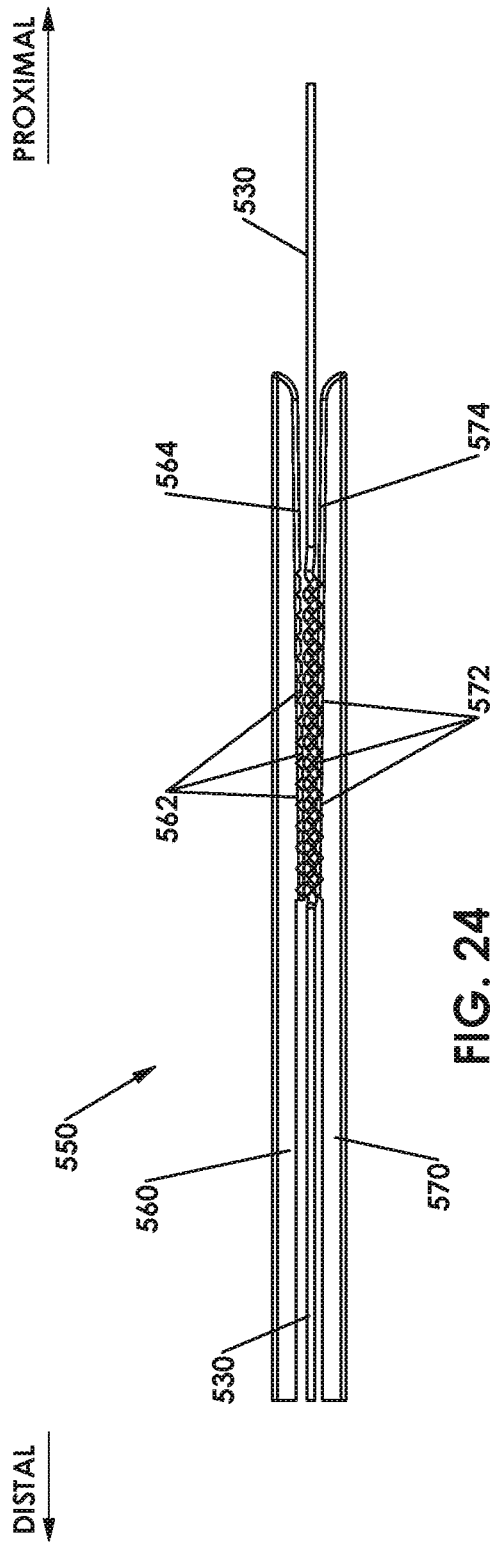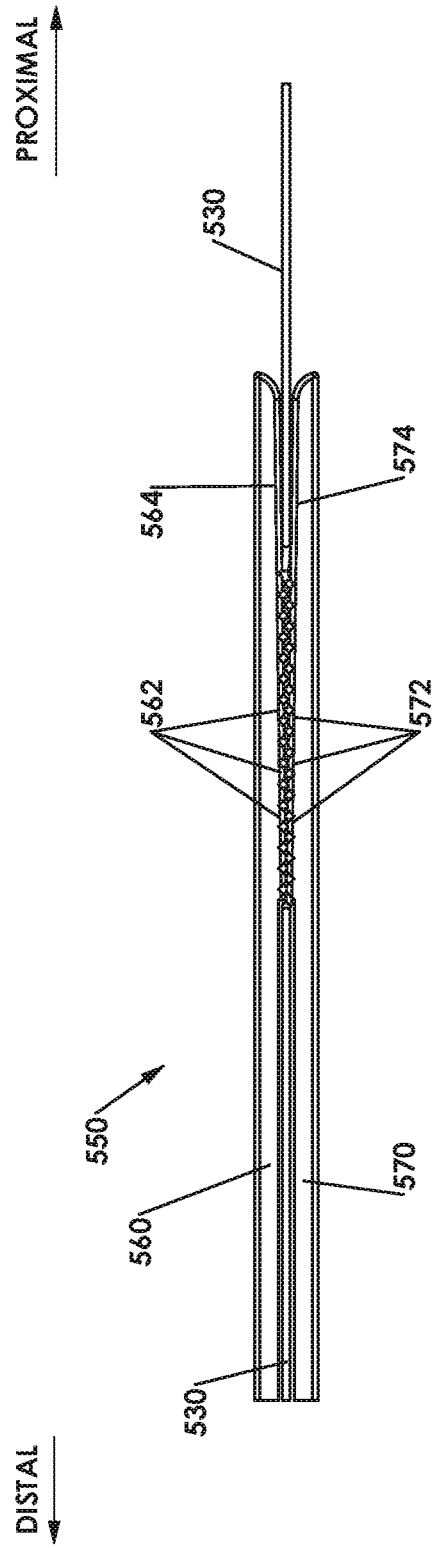

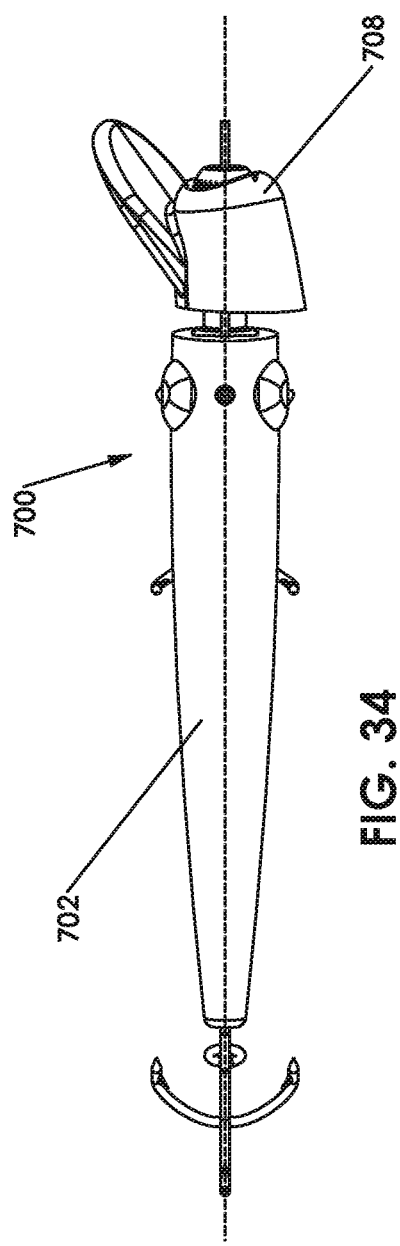
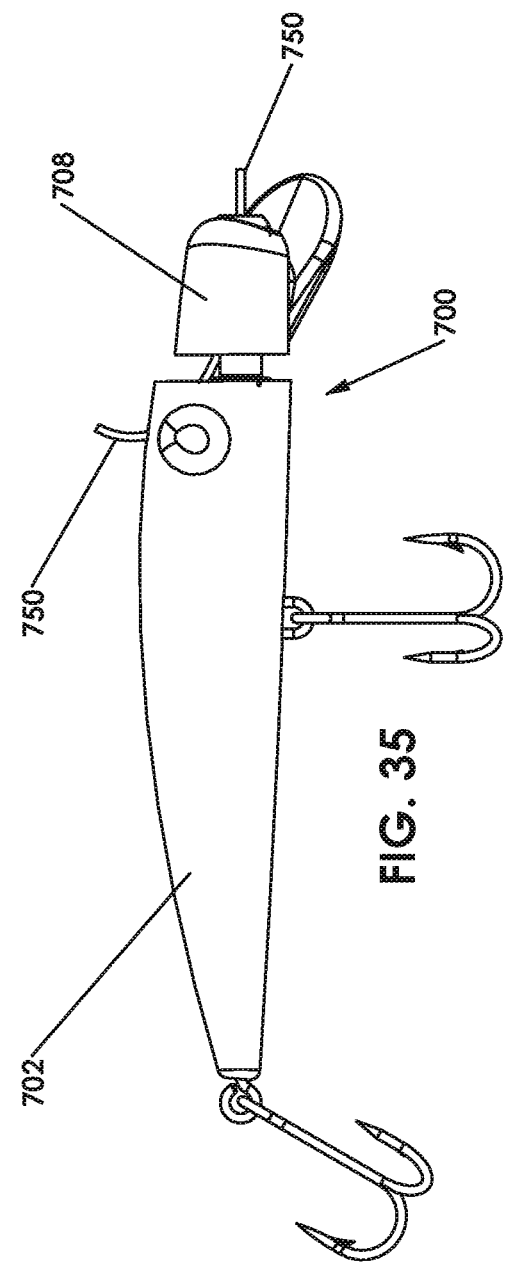
FIG. 34
FIG. 35

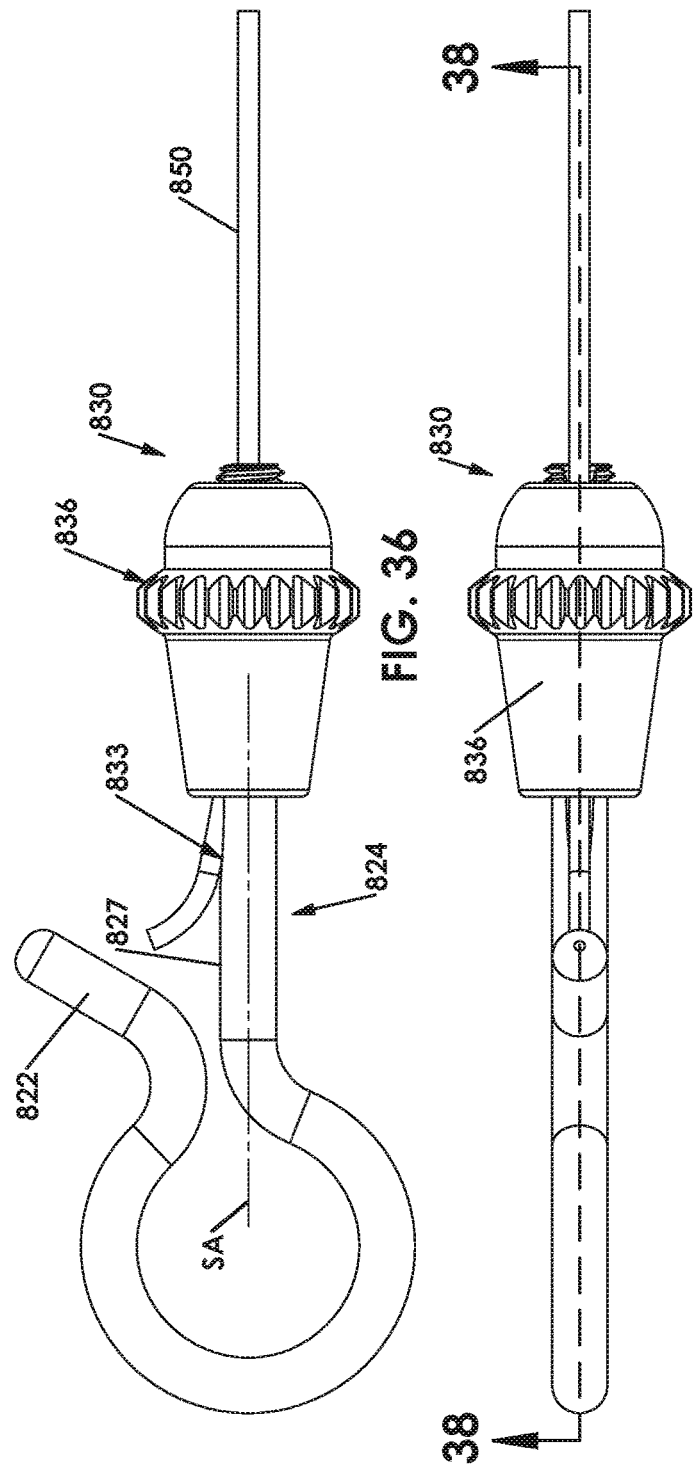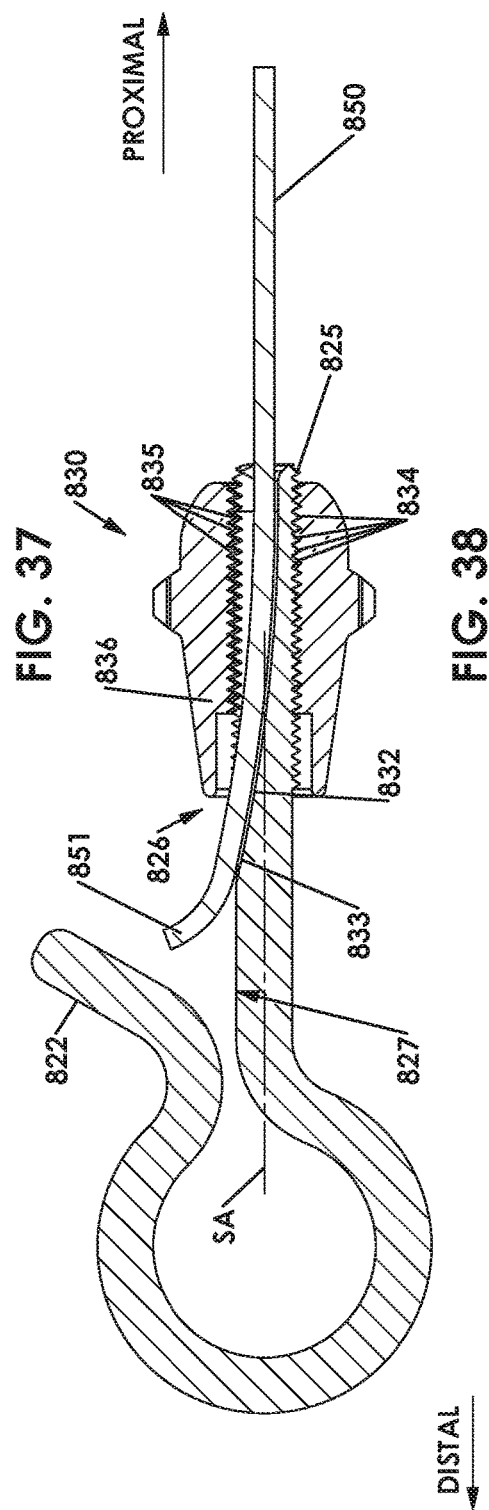

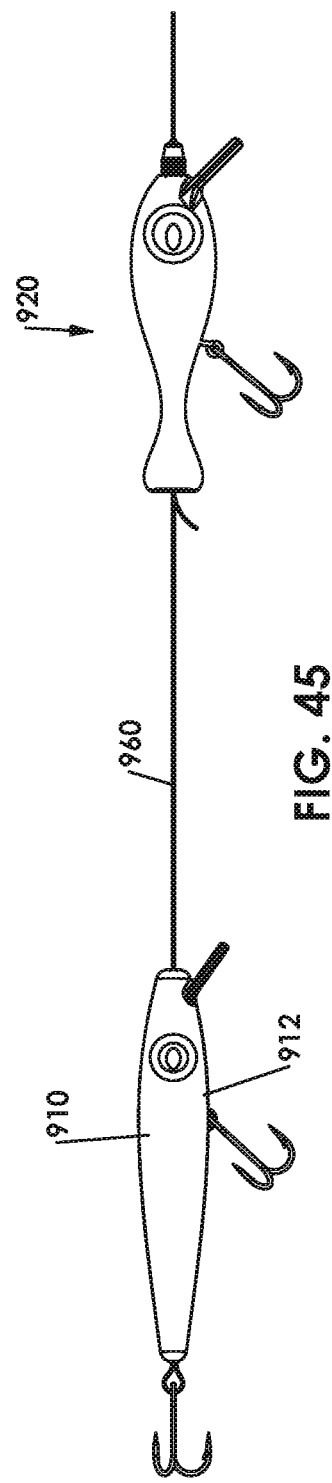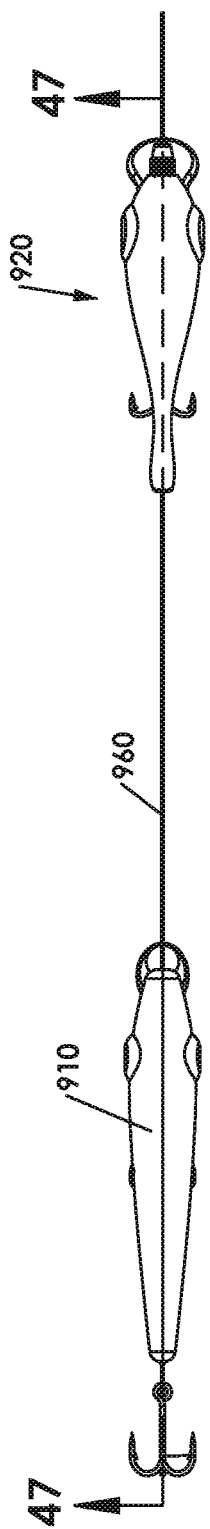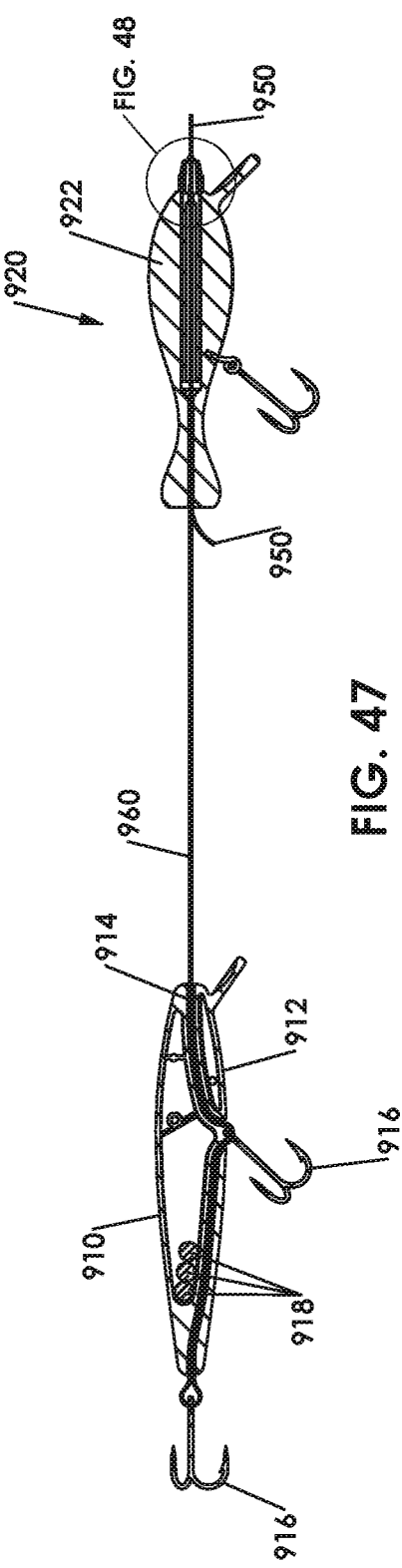

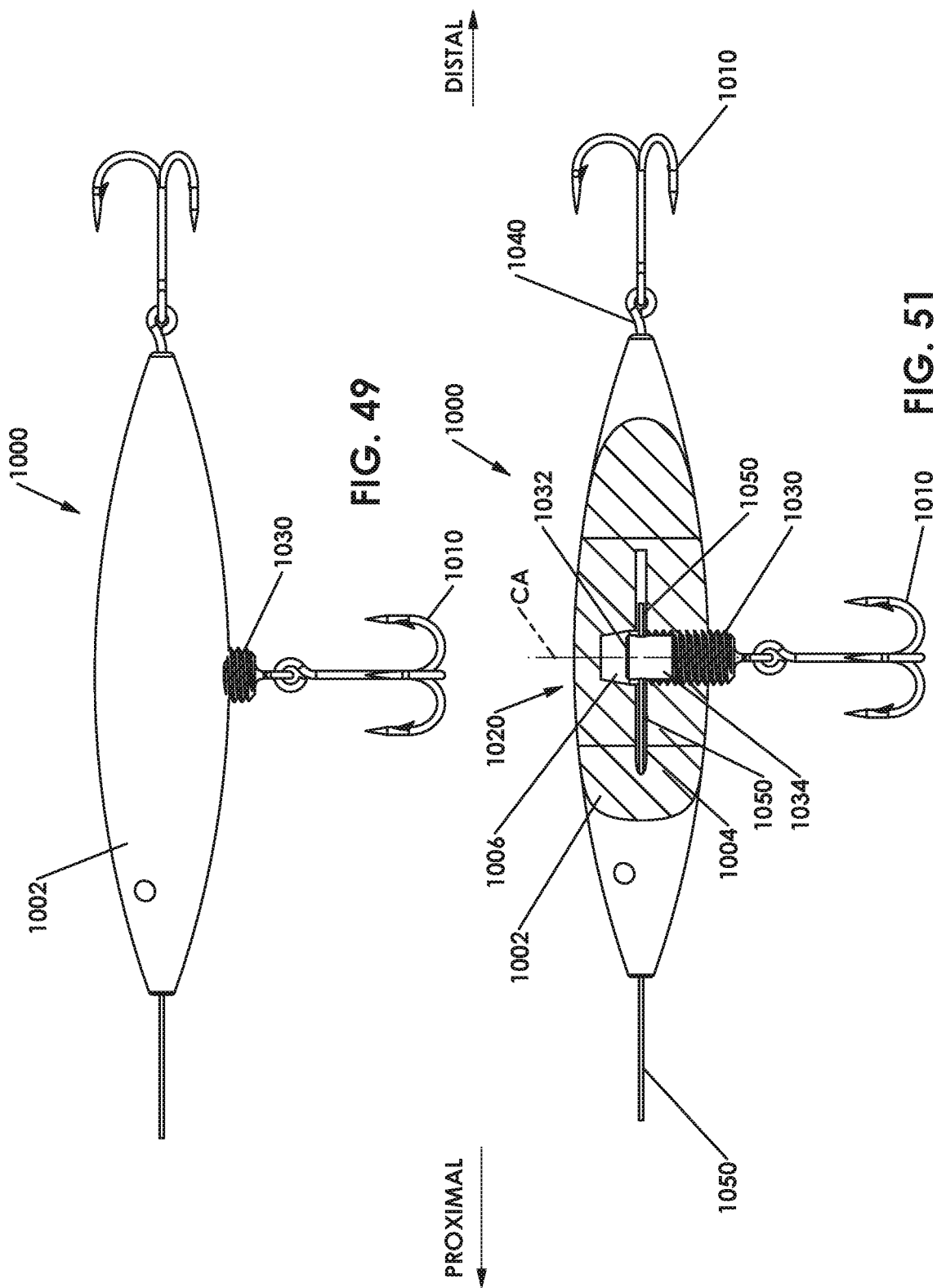

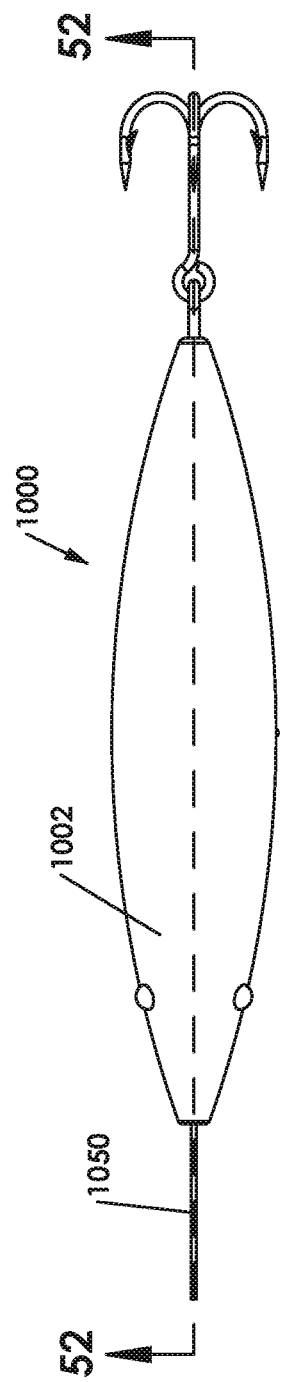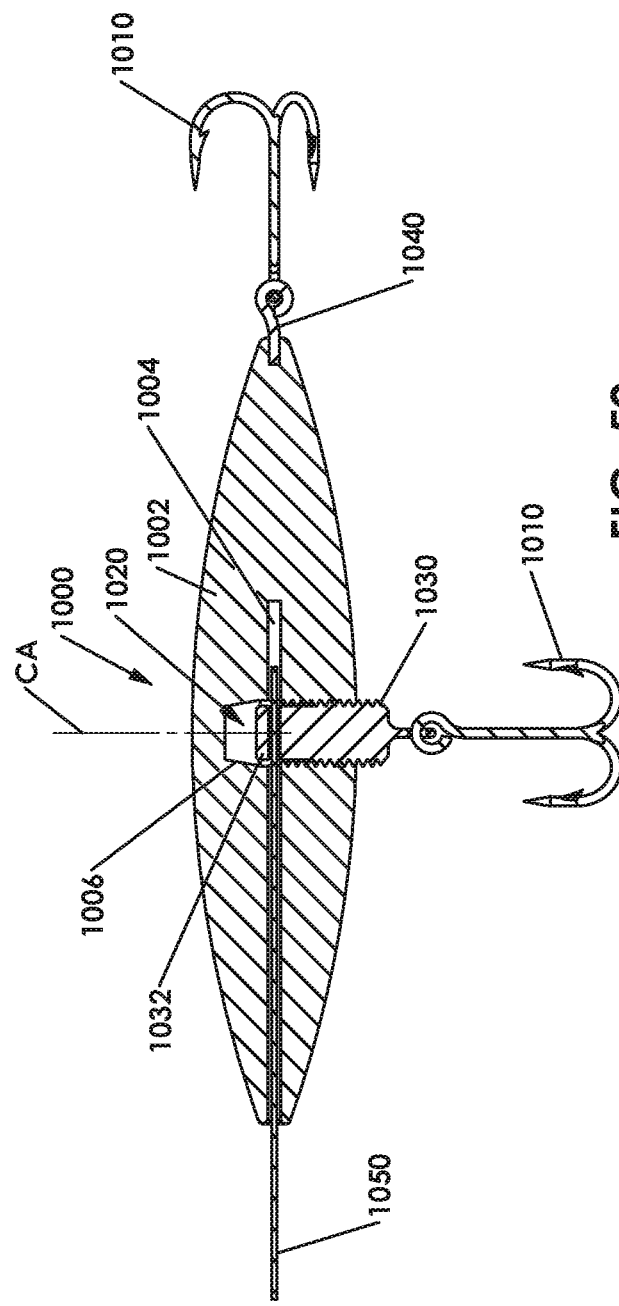

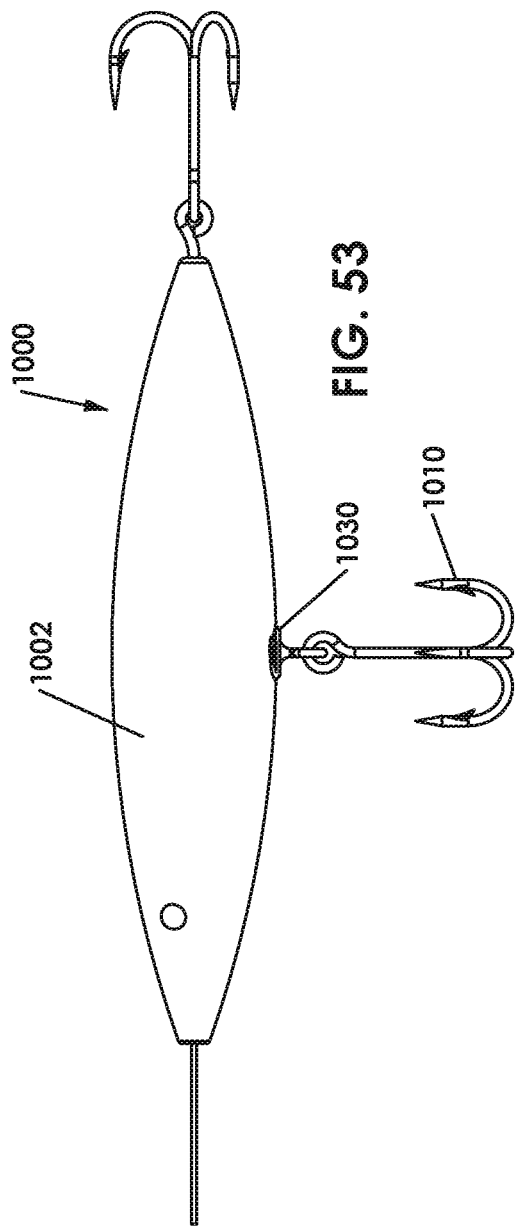
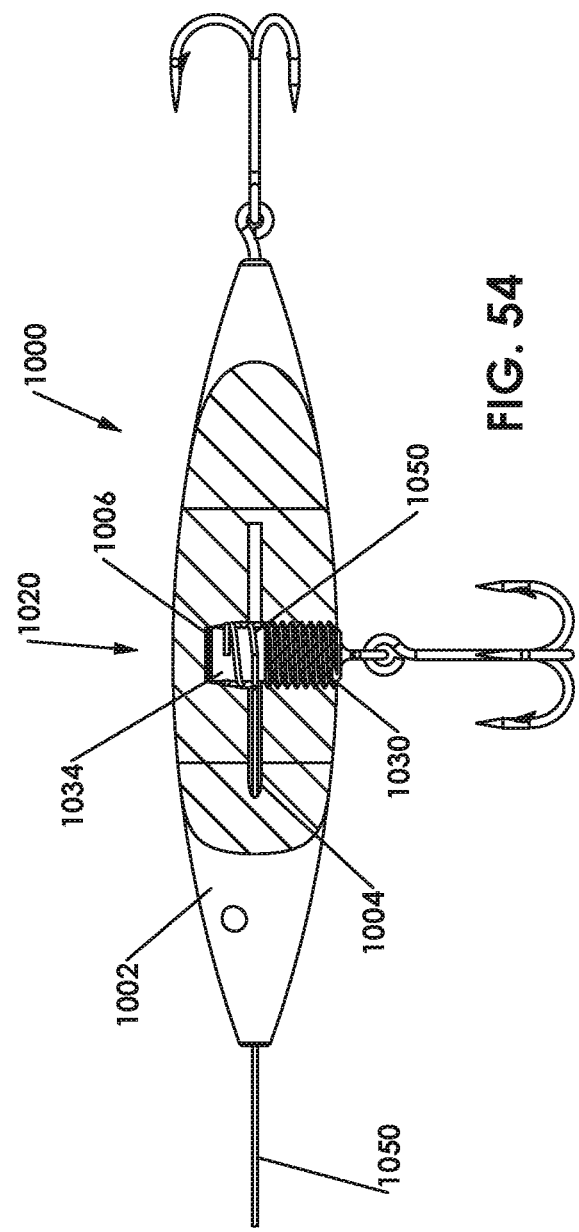

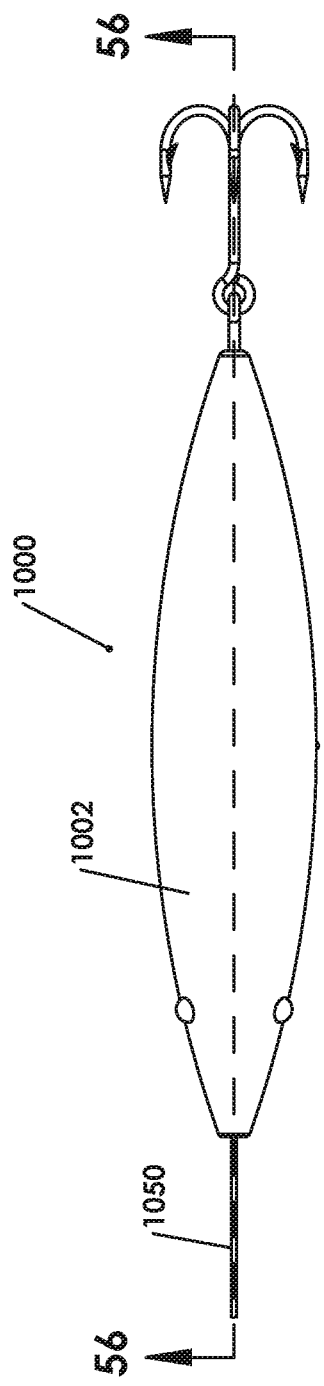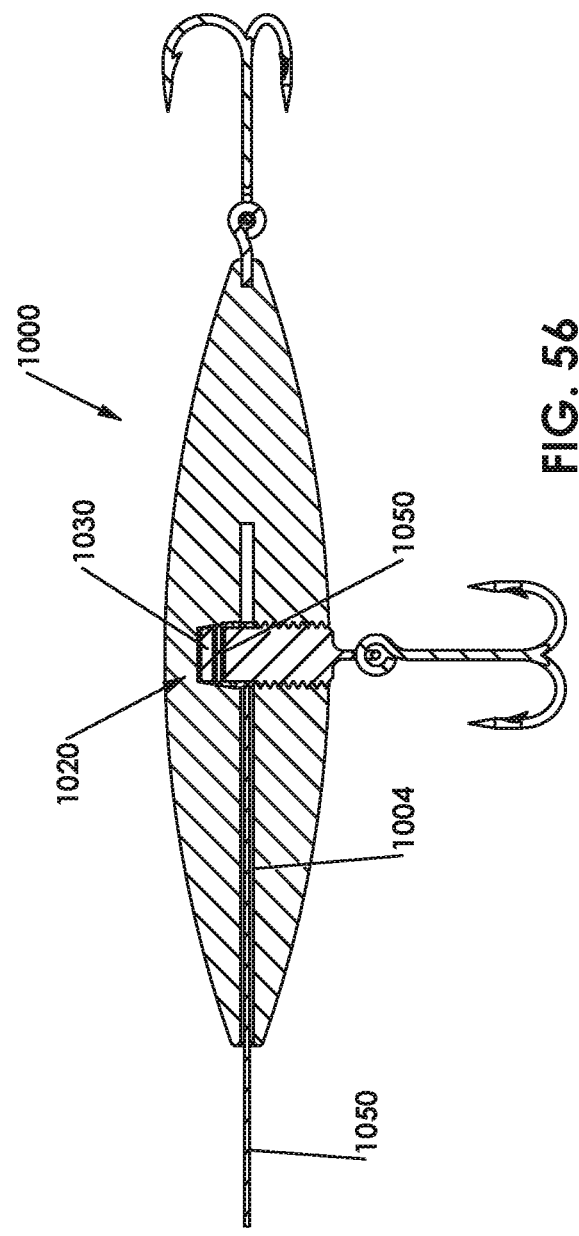

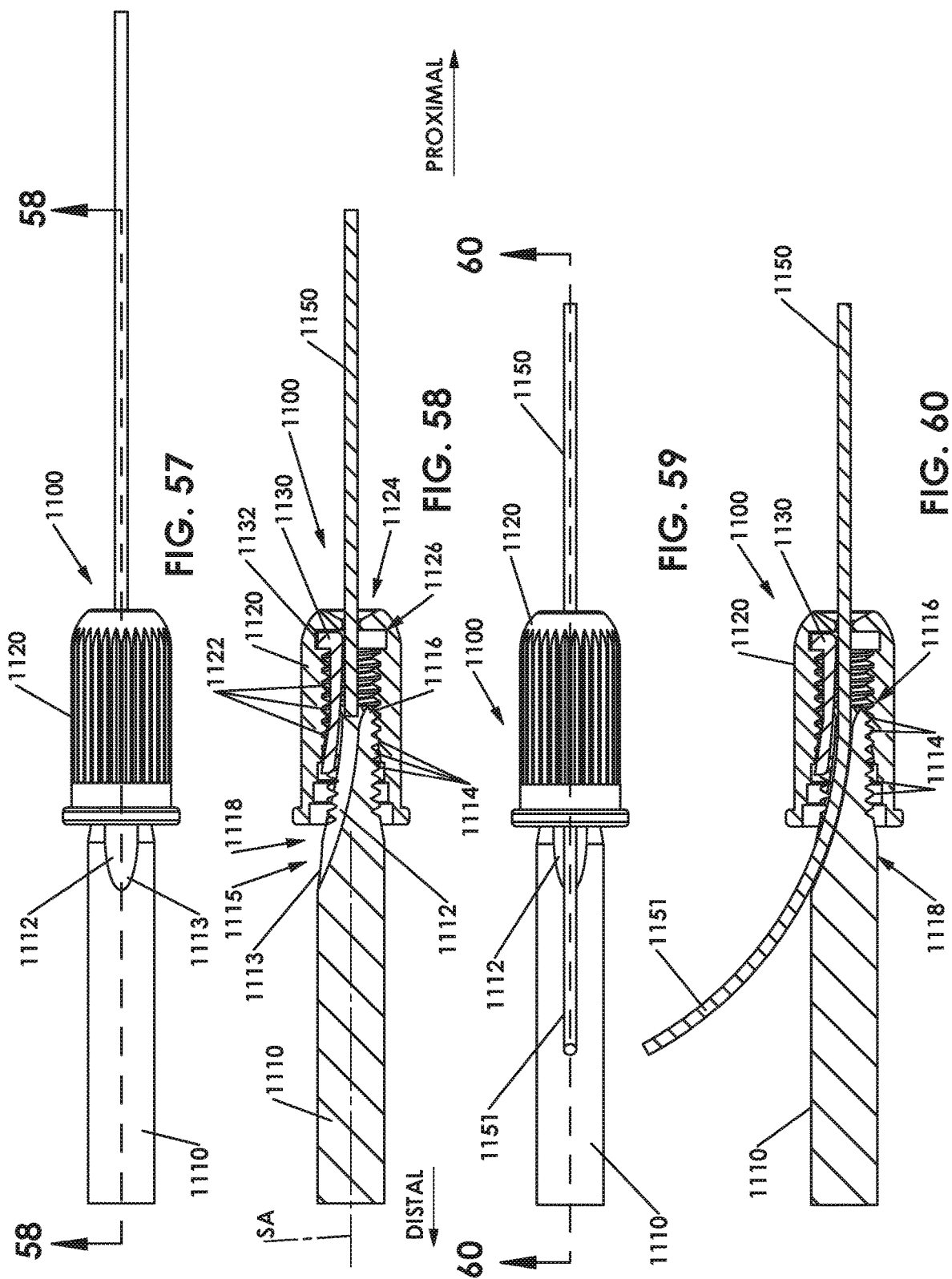

KNOTLESS COUPLER ARRANGEMENTS FOR ATTACHING FISHING IMPLEMENTS TO FISHING LINES

CROSS REFERENCE TO RELATED APPLICATIONS

This non-provisional application claims the benefit under 35 U.S.C. § 119(e) of U.S. Provisional Patent Application Ser. No. 62/817,772, entitled KNOTLESS COUPLER ARRANGEMENTS FOR ATTACHING FISHING IMPLEMENTS TO FISHING LINES, filed Mar. 13, 2019, of U.S. Provisional Patent Application Ser. No. 62/807,411, entitled FISHING IMPLEMENTS, filed Feb. 19, 2019, and of U.S. Provisional Patent Application Ser. No. 62/750,359, entitled COUPLER ARRANGEMENTS FOR ATTACHING FISHING IMPLEMENTS TO FISHING LINES, filed Oct. 25, 2018, the disclosures of which are incorporated by reference herein in their entirety.

FIELD OF THE INVENTION

The present invention generally relates to methods and devices for attaching lines to objects and more particularly, to fishing implements including, but not limited to fish hooks, fishing lures and equipment with couplers and coupling arrangements configured to facilitate easy attachment and detachment of fishing line thereto.

BACKGROUND

It can often be tedious and time consuming to tie a fishing line onto a fishing hook, lure or other piece of fishing equipment that is sufficiently strong to hold a fish when caught. Many professional anglers participate in timed tournaments for prize money, whereby speed is of the essence in tying on lures, keeping lures in the water, getting strikes, quickly releasing the fish, and of course not losing any of fish that are hooked. And even with pleasure-seeking casual anglers, long periods of time to tie on lures detracts from the period a lure is in the water. Many anglers, especially young ones (children), are unaware how, and often cannot properly tie, the large array of strong fishing knots. For example, one source of fishing knot techniques (www.netknots.com) identifies nearly 40 different knots for different fishing related applications, and which can vary in complexity and holding strength, depending upon the application and fishing lines used. Such knots can be complex and difficult to learn and, if not properly tied, can result in the loss of a fish and/or the hook or lure tied thereto.

The challenge of properly tying fishing-related knots is often exacerbated by unstable conditions in which the angler is located during the implementation of the tying procedure. For example, the angler may be standing in a flowing stream, be located in a kayak or boat, and/or be experiencing cold and wet conditions which may numb the fingers making it difficult to manipulate the small diameter fishing line. These difficulties can be further aggravated due to the relatively small fishing line and hook eyelets which can be difficult to see in low light conditions and/or for anglers with generally poor eyesight.

If the fishing line breaks or the knot fails, a new knot must be tied onto the replacement hook or lure. Fishing line sizes and types vary in diameter, weight and composition, which incompatibilities between lures and lines can compromise lure performance and knot security. For example, some lines may comprise monofilament line, while other lines may be of various braided compositions; polymers, blends, and sometimes and steel or Titanium composites. Very significantly, the current knots tied in fishing lines cause significant stress points in the fishing line, and often a reduction in line diameters, which are usually the location for breaks in the line and corresponding loss of fish, lures, and other terminal tackle. Some fishing lines may be coated with lubricant materials such as Teflon®, or become wet, which can make the line very slippery and difficult to tie, and such coatings and wetness may adversely impact the knot strength. Likewise, lures and hooks vary in size, shape and weight, which can also complicate the knot tying process. Further, if the knot or attachment hardware becomes too extraneous to the lure, it may not look natural and may spook the fish.

Various forms of the subject invention disclosed herein may address many if not all of the foregoing challenges. The foregoing discussion is intended only to illustrate some of the shortcomings present in the field of the invention at the time, and should not be taken as a disavowal of claim scope.

BRIEF DESCRIPTION OF THE FIGURES

Various features of the embodiments described herein, together with advantages thereof, may be understood in accordance with the following description taken in conjunction with the accompanying drawings as follows:

FIG. 1 is a plan view of a fishing implement including a knotless line-coupling arrangement for attaching a fishing line to the fishing implement;

FIG. 2 is a side view of the fishing implement of FIG. 1;

FIG. 3 is a cross-sectional side view of the knotless line-coupling arrangement of FIG. 1 in an unlocked position;

FIG. 4 is a cross-sectional side view of the knotless line-coupling arrangement of FIG. 1 in a locked position;

FIG. 8 is a plan view of the fishing implement of FIG. 5 after the fishing line has been coupled thereto;

FIG. 9 is a side view of the fishing implement of FIG. 8;

FIG. 10 is a cross-sectional view of the fishing implement of FIG. 8 taken along line 10-10 in FIG. 8 showing the fishing line coupled thereto by the knotless line-coupling arrangement thereof;

FIG. 11 is an enlarged partial cross-sectional view of the knotless line-coupling arrangement of the fishing implement of FIG. 5 in a locked configuration;

FIG. 12 is a plan view of another fishing implement that employs another form of a knotless line-coupling arrangement for attaching a fishing line thereto;

FIG. 13 is a cross-sectional side view of the fishing implement and knotless line-coupling arrangement of FIG. 12 taken along line 13-13 in FIG. 12 prior to the attachment of the fishing line thereto;

FIG. 14 is another cross-sectional side view of the fishing implement and knotless line-coupling arrangement of FIG. 12 taken along line 14-14 in FIG. 12 during initial insertion of the fishing line into the knotless line-coupling arrangement thereof;

FIG. 15 is another cross-sectional side view of the fishing implement and knotless line-coupling arrangement of FIG. 12 taken along line 15-15 in FIG. 12 after the fishing line has been coupled thereto by the knotless line-coupling arrangement thereof;

FIG. 17 is a plan view of another fishing implement that employs another form of a knotless line-coupling arrangement for attaching a fishing line thereto;

FIG. 18 is a cross-sectional view of the fishing implement and knotless line-coupling arrangement of FIG. 17 taken along line 18-18 in FIG. 17 prior to insertion of the fishing line therein;

FIG. 24 is a side view of an upper and lower frame portion of a knotless line coupling-arrangement in an open configuration with a fishing line received therein and the frame portions including opposing teeth that are longitudinally offset from one another;

FIG. 25 is a side view of the frame portion of FIG. 24 with the knotless line-coupling arrangement in a closed configuration;

FIG. 34 is a plan view of the fishing implement of FIG. 30 during an initial insertion of a fishing line into the knotless line-coupling arrangement thereof;

FIG. 35 is a side view of the fishing implement of FIG. 34;

FIG. 36 is a side view of another knotless line-coupling arrangement for attaching a fishing line to a fishing implement in the form of a hook;

FIG. 37 is a plan view of the knotless line-coupling arrangement of FIG. 36;

FIG. 38 is a cross-sectional view of the knotless line-coupling arrangement of FIG. 37 taken along line 38-38 in FIG. 37;

FIG. 45 is a side view of the fishing implement and lead lure of FIGS. 41-44 after the fishing line has been coupled to the lead lure by the knotless line-coupling arrangement thereof;

FIG. 46 is a plan view of the fishing implement and lead lure of FIG. 45;

FIG. 47 is a cross-sectional view of the fishing implement and lead lure of FIG. 46 taken along line 47-47 in FIG. 46 illustrating the fishing line coupled to the knotless line-coupling arrangement within the lead lure;

FIG. 49 is a side view of another fishing implement that employs another form of a knotless line-coupling arrangement for attaching a fishing line thereto;

FIG. 50 is a plan view of the fishing implement of FIG. 49;

FIG. 51 is another side view of the fishing implement of FIG. 49 with a portion thereof shown in cross-section to illustrate an initial insertion of a fishing line into the knotless line-coupling arrangement therein;

FIG. 52 is a cross-sectional view of the fishing implement of FIG. 50 taken along line 52-52 in FIG. 50 with the body and connector portion shown in cross-section and the fishing line initially inserted into the connector;

FIG. 53 is side view of the fishing implement of FIGS. 49-53 with the fishing line coupled thereto;

FIG. 54 is another side view of the fishing implement of FIG. 53 with a portion thereof shown in cross-section to illustrate the fishing line coupled to the implement by the connector of the knotless line-coupling arrangement thereof;

FIG. 55 is a plan view of the fishing implement of FIG. 53;

FIG. 56 is a cross-sectional view of the fishing implement of FIG. 55 taken along line 56-56 in FIG. 55 showing the fishing line coupled to the implement;

FIG. 57 is a plan view of another knotless line-coupling arrangement illustrating an initial insertion of a fishing line therein;

FIG. 58 is a cross-sectional view of the knotless line-coupling arrangement of FIG. 57 taken along line 58-58 in FIG. 57;

FIG. 59 is another plan view of the knotless line-coupling arrangement of FIG. 57 after the fishing line has been fully inserted therein;

FIG. 60 is a cross-sectional view of the knotless line-coupling arrangement of FIG. 59 taken along line 60-60 in FIG. 59;

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Figure 7:
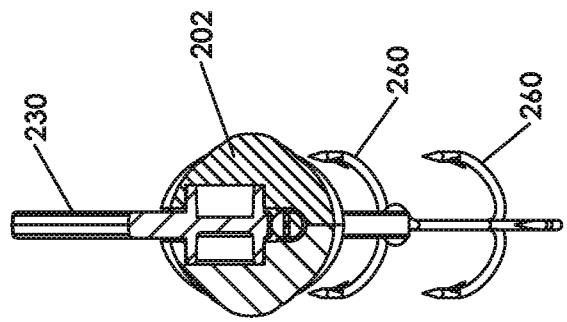
FIG. 7 is a cross-sectional end view of the fishing implement of FIG. 5 taken along line 7-7 in FIG. 5 prior to insertion of the fishing line into the knotless line-coupling arrangement thereof.
Figure 5:
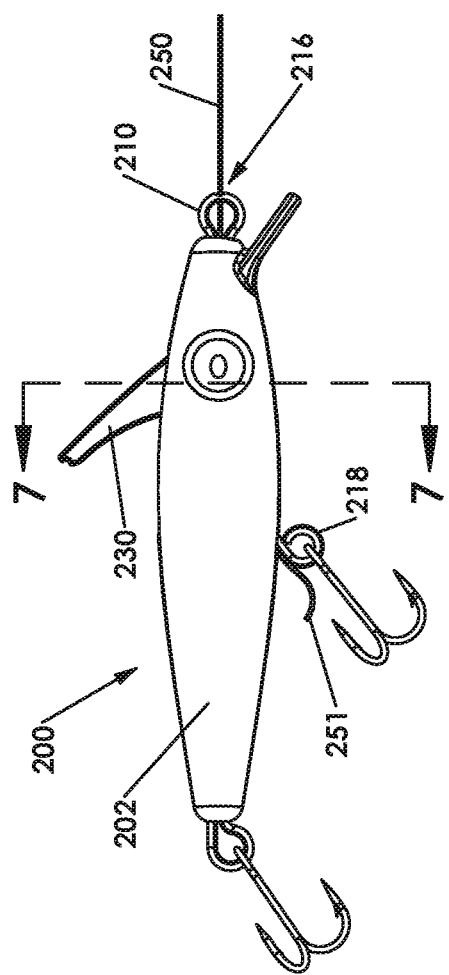
FIG. 5 is a side view of another fishing implement including another knotless line-coupling arrangement for attaching a fishing line thereto.
Figure 6:
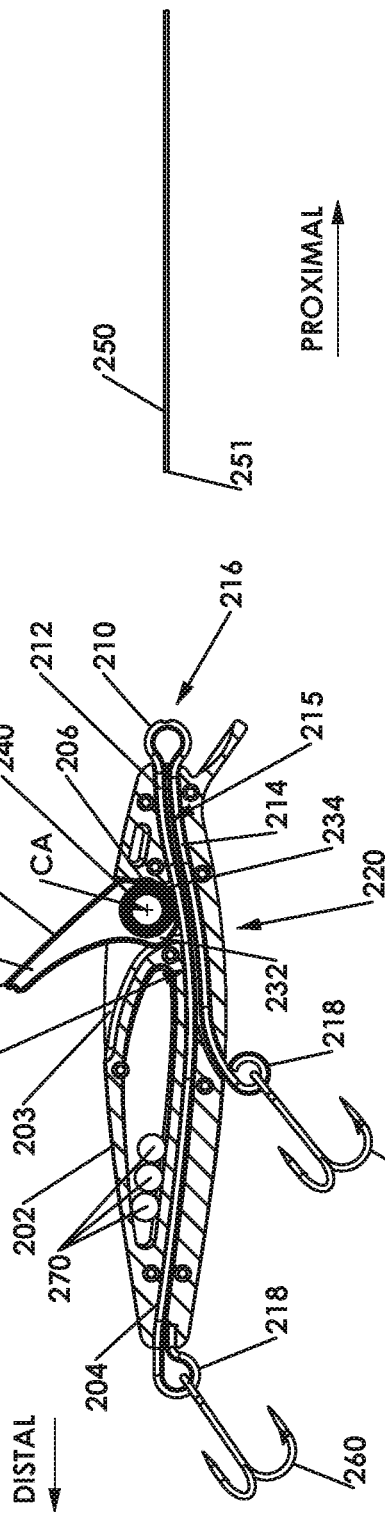
FIG. 6 is a side cross-sectional view of the fishing implement of FIG. 5 prior to insertion of the fishing line into the knotless line-coupling arrangement thereof.
Figure 16:
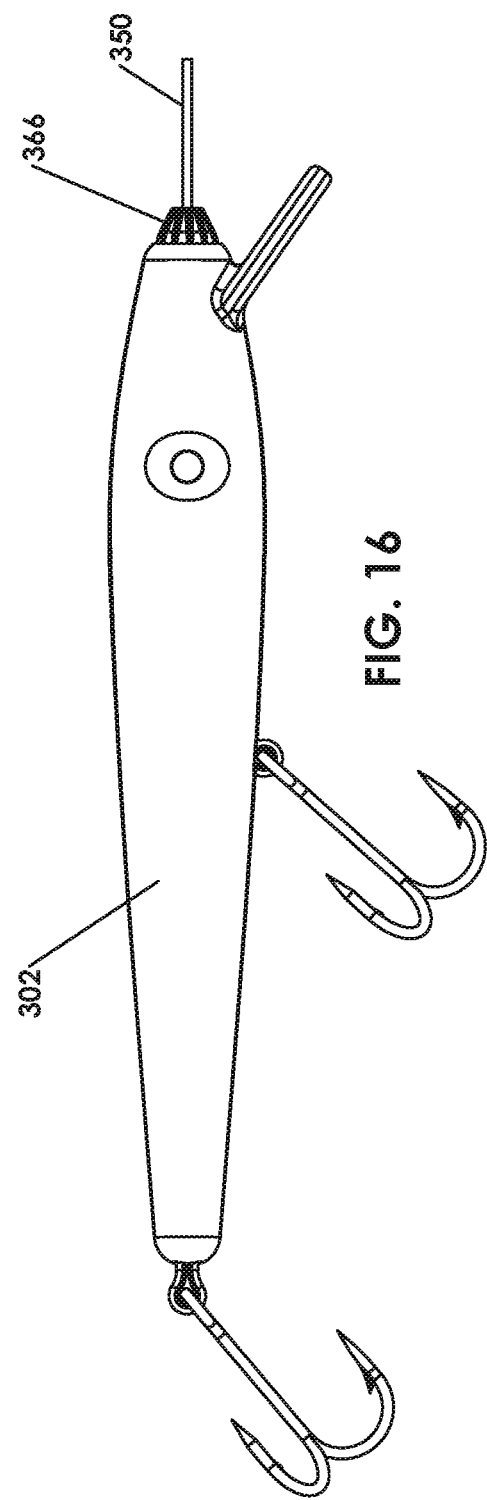
FIG. 16 is a side view of the fishing implement of FIG. 12 with the fishing line coupled thereto.
Figure 19:
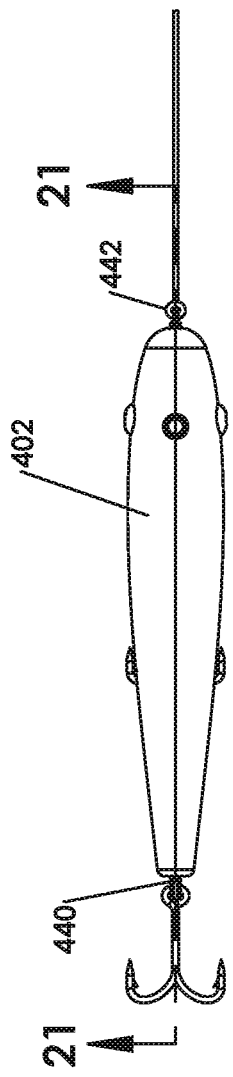
FIG. 19 is another plan view of the fishing implement of FIG. 17 after the fishing line has been coupled thereto.
Figure 20:
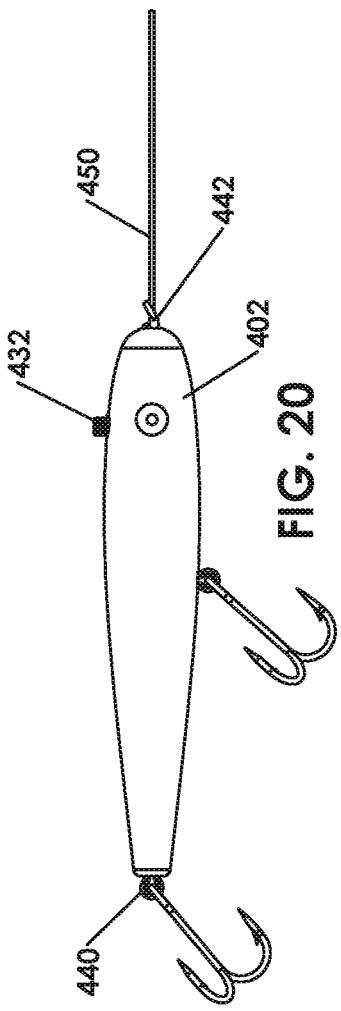
FIG. 20 is a side view of the fishing implement of FIG. 19 with the fishing line coupled thereto.
Figure 21:
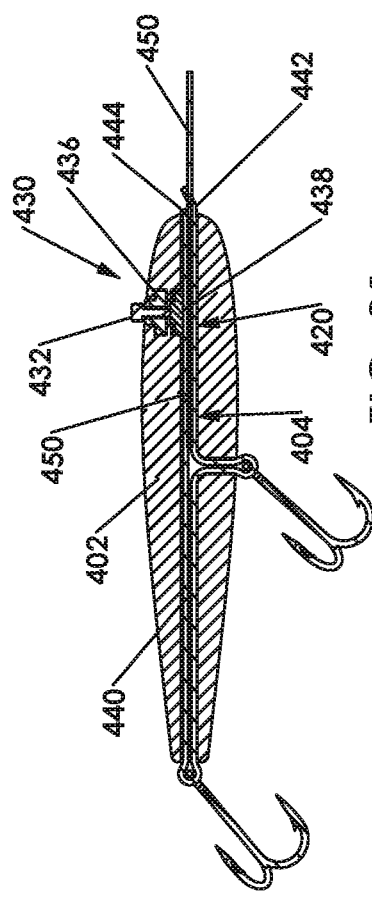
FIG. 21 is another cross-sectional view of the fishing implement of FIG. 19 taken along line 21-21 in FIG. 19 showing the fishing line clamped thereto by the knotless line-coupling arrangement thereof.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the various embodiments of the present invention is defined solely by the claims. The features illustrated or described in connection with one exemplary embodiment may be combined with the features of other embodiments. Such modifications and variations are intended to be included within the scope of the present invention.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

The terms "proximal" and "distal" are used herein with reference to a user or angler manipulating the handle portion of a fishing pole or rod, for example. The term "proximal" refers to the portion closest to the angler and the term "distal" refers to the portion located away from the angler. It will be further appreciated that, for convenience and clarity, spatial terms such as "vertical", "horizontal", "up", and "down" may be used herein with respect to the drawings. However, fishing implements, poles, rods, lines, etc. are used in many orientations and positions, and these terms are not intended to be limiting and/or absolute.

The term "fishing implement" as used herein is intended to encompass a wide array of fish-catching and fishing-related devices including, but not limited to, a variety of different fish hook styles and configurations, fish lures (regardless of composition, e.g., plastic-hard and soft, wood, rubber, metal etc. that may include a shaft arrangement for attachment to a fishing line) and clips, swivels and attachment devices, apart from fish hooks and lures, that are adapted for attaching fish hooks, lures, etc. to a fishing line. Those of ordinary skill in the art will also appreciate that the various "knotless" line-coupling arrangements disclosed herein as well as equivalents thereof may be affectively used in connection with a variety of different fishing line and leader arrangements regardless of their particular composition.

FIGS. 1-4 illustrate a knotless line-coupling arrangement 120 that is configured to attach a fishing line 150 to a fishing implement in the form of a fishing lure 100. In the illustrated example, the fishing lure 100 comprises a body portion 102 that is shaped, for example, to resemble a bait fish. Those of ordinary skill in the art will appreciate, however, that the body portion 102 may be provided in a variety of shapes known or otherwise determined to attract fish. Thus, the term "fishing lure" as used herein includes, those body configurations that are attractive to a particular target species of fish, but is not limited to the specific exemplary body shapes depicted in the Figures included herein.

In the illustrated example, the body portion 102 includes a longitudinal slot 104 defined in the body portion 102. See FIGS. 3 and 4. The longitudinal slot 104 is configured to receive a line-gripping member in the form of a frame portion 110 of the line-coupling arrangement 120. The frame portion 110 and an opposing line-gripping member in the form of a sidewall 107 of the longitudinal slot 104 form a line-receiving passage 115 therebetween. In other words, the sidewall 107 is positioned opposite the frame portion 110, and the line-receiving passage 115 is defined between the sidewall 107 and the frame portion 110. The frame portion 110 is partially housed within the longitudinal slot 104 and partially housed within a cavity 109 located in the proximal end of the lure body 102. The frame portion 110 is biased away from or otherwise oriented relative to the sidewall 107 of the longitudinal slot 104, such that when no exterior forces are applied to the frame portion 110, the line-receiving passage 115 is unobstructed and may relatively freely receive the fishing line 150 therein. An opening 101 is provided in a distal end of the body portion 102 to enable a portion of the fishing line 150 to exit the longitudinal slot 104. As will be discussed in further detail below, this feature enables the user to visually confirm that the fishing line has been completely inserted through the body portion 102 to ensure proper coupling of the line to the lure 100.

The body portion 102 may be formed by affixing two halves together, for example. In at least one arrangement, the body segments or half portions may be attached together by an appropriate adhesive or by appropriate mechanical fasteners—screws, rivets, snap features, etc. However, other embodiments are envisioned where the body portion 102 is constructed as one unitary piece. In the illustrated example, the lure 100 further comprises a second or lower frame portion 112 which includes connector portions 118 which extend beyond the body portion 102 of the lure 100 for attachment to hooks 160. See FIG. 3. In various embodiments, to enhance the attractiveness of the lure 100 as it is drawn through water, rattle weights/balls 170 may be positioned within a cavity 162 in the body portion 102. Such weights 170 may, for example, provide the lure with a rattling noise as the lure 100 is retrieved through the water.

Further to the above, the line-coupling arrangement 120 of the illustrated example further comprises a locking mechanism in the form of a cam or latch arm 130 that is rotatable relative to the body portion 102 about a cam axis CA. The cam arm 130, the frame portion 110, and the longitudinal slot 104 form the line-coupling arrangement 120. The cam arm 130 is movably or rotatably supported in a cavity 103 of the body portion 102 by an axle lug 140 that is rotatably received in a corresponding cavity (not shown) in the body portion 102. Such arrangement facilitates rotation of the cam arm 130 relative to the body portion 102 between an unlocked position (see FIG. 3) and a locked position (see FIG. 4). In the illustrated arrangement, the cam arm 130 has a cam surface 132 formed thereon. In addition, the cam arm 130 is formed with a retainer portion 134 that is formed to lockingly engage a corresponding lock detent or latch area 106 formed in the body portion 102. When the cam arm 130 is in the locked position, the retainer portion 134 on the cam arm 130 is retainingly seated within the lock detent 106 to retain the cam arm 130 in the locked position. When the user desires to move the cam arm 130 to the unlocked position (FIG. 3), the retainer portion 134 is moved out of the lock detent 106.

Further to the above, the cam surface 132 of the cam arm 130 is configured to bias the frame portion 110 toward the sidewall 107 of the longitudinal slot 104 when the cam arm 130 is in the locked position. More specifically, when the cam arm 130 is in the unlocked position (see FIG. 3), the cam surface 132 of the cam arm 130 is out of camming engagement with the frame portion 110 which permits the frame portion 110 to be spaced apart from the sidewall 107 of the longitudinal slot 104 so that the line-receiving passage 115 is established therebetween.

To attach a fishing line 150 to the fishing lure 100, the user first pivots the cam arm 130 to the unlocked position. An end 151 of the fishing line 150 is inserted into a proximal opening 116 that is formed in the proximal end of the body 102 and into the line-receiving passage 115 until the end 151 of the fishing line 150 protrudes out of the body portion 102 at the distal end of the lure 100. See FIG. 3. Once the user has confirmed that the line 150 has been completely inserted through the line-receiving passage 115, the user then pivots the cam arm 130 to the locked position shown in FIG. 4. As the cam arm 130 is moved into locked position, the cam surface 132 thereon engages the frame portion 110 and moves the frame portion 110 toward the sidewall 107 of the longitudinal slot 104 thereby securing, pinching, clamping, gripping and/or retaining the fishing line 150 therebetween (see FIG. 4). The line-coupling arrangement 120 allows the fishing line 150 to be secured, pinched, clamped, gripped, and/or retained over an extended surface area which may improve the holding power of the line-coupling arrangement 120 and avoid the establishment of discrete and significant local stress points in the line which might compromise the connection. In other words, the fishing line 150 is secured, pinched, clamped, gripped, and/or retained to affix the line 150 to the line-coupling arrangement 120 in an "atraumatic" manner without damaging the line to establish a full strength connection. Other embodiments are envisioned where the frame portion 110 and/or the longitudinal slot 104 include a tortuous surface comprising teeth, textured surfaces, abraded surfaces, grooves, ridges, etc. to secure, pinch, clamp, grip, and/or retain the fishing line 150 when the cam arm 130 is in the locked position.

As used herein, the term "textured" as related to a surface includes but is not limited to a surface that is bead blasted, sand blasted, or otherwise abraded, such as the surface of 200 grit sand paper, for example, which would effectively increases the coefficient of static friction between the textured surface and a portion of fishing line above 0.4, for example.

As used herein, the terms "atraumatic" and "atraumatically" means that the integrity of a portion of fishing line that is secured, pinched, clamped, gripped and/or retained in the various manners disclosed herein has not been compromised to a point wherein that portion of line would be more likely to fail or break than the portions of fishing line that are not secured when placed under similar amounts of tension. Such "knotless" line-coupling arrangements may be stronger and faster to complete than using conventional knots that are typically used in fishing applications. For example, when using knots to tie fish hooks onto fishing lines, the knots commonly constitute a weak point, yielding only a fraction of the overall line strength.

Also in the illustrated arrangement, the cam arm 130 is shaped to somewhat closely match an outer contour or outer perimeter 105 of the lure body portion 102 when the cam arm 130 is in the locked position. Stated another way, the cam arm 130 is largely or substantially received within the cavity 103 in the body portion 102 but for, for example, an end portion 131 of the cam arm 130 which may facilitate movement of the cam arm 130 to the unlocked position when desired. For example, the end portion 131 may be easily engaged with a finger nail or tool to flip or otherwise move the cam arm 130 to the unlocked position. When in the locked position illustrated in FIG. 4, an outer surface 133 of the cam arm 130 substantially matches the outer contour 105 of the lure body 102. In other words, the outer surface 133 of the cam arm 130 is streamlined with the outer contour 105 of the lure body 102 when the cam arm 130 is in the locked position. Thus, when in the locked position, the cam arm 130 may not materially affect the manner in which the lure displaces water as it retrieved through the water. Further, in the illustrated embodiment, the end portion 131 may be shaped to resemble a dorsal fin which may not only stabilize the lure to prevent the lure from rolling during retrieval, but also add to the lure's "fish-like" appearance. Other variations of the cam arm may include other protrusions designed to cause desired affects and appearances as the lure is retrieved through the water. A further advantage that may be afforded by this embodiment concerns the relative ease in which the fishing line may be attached to the lure. In this embodiment, the user simply has to pivot the cam arm to the unlocked position and insert the fishing line. This action may be easily accomplished for example when the user's hands are wet and cold.

FIGS. 5-11 illustrate another knotless line-coupling arrangement 220 that is configured to attach a fishing line 250 to a fishing implement in the form of a fishing lure 200. The fishing lure 200 comprises a body portion 202 that includes a longitudinal slot 204 defined in the body portion 202. The longitudinal slot 204 is configured to receive a frame 210 of the line-coupling arrangement 220. In the illustrated arrangement, the frame 210 is formed from a single piece of spring steel, or other suitable material, and includes line-gripping members in the form of an upper frame portion 212 and a lower frame portion 214 that are spaced from each other to form a line-receiving passage 215 therebetween. The upper frame portion 212 is housed entirely within the longitudinal slot 204 and exits the body portion 202 through an opening at the distal end of the body portion 202. The lower frame portion 214 is partially housed within the longitudinal slot 204 but exits the body portion 202 through an additional groove, or slot 208, which exits the body portion 202 between the proximal and distal ends of the body portion 202. The body portion 202 may be formed by affixing two halves together, for example. However, other embodiments are envisioned where the body portion 202 is constructed as one unitary piece. The frame 210 further comprises connector portions 218 which extend beyond the body portion 202 of the lure 200 for attachment to hooks 260. Further, rattle weights 270 may be positioned within a cavity 262 in the body portion 202 of lure 200 to cause a rattling noise as the lure 200 is retrieved through the water.

Further to the above, the line-coupling arrangement 220 further comprises a locking mechanism in the form of a cam arm 230 that is rotatable relative to the body portion 202 about a cam axis CA. The cam arm 230, the upper frame portion 212, and the lower frame portion 214 form the line-coupling arrangement 220. The cam arm 230 is movably or rotatably supported in a cavity 203 of the body portion 202 by an axle lug 240 that is rotatably received in a corresponding cavity (not shown) in the body portion 202. Such arrangement facilitates rotation of the cam arm 230 relative to the body portion 202 between an unlocked position (see FIG. 6) and a locked position (see FIG. 10). In the illustrated arrangement, the cam arm 230 has a cam surface 232 formed thereon. In addition, the cam arm 230 is formed with a retainer portion 234 that is formed to lockingly engage a corresponding lock detent 206 formed in the body portion 202. When the cam arm 230 is in the locked position, the retainer portion 234 on the cam arm 230 is retainingly seated within the lock detent 206 to retain the cam arm 230 in the locked position. When the user desires to move the cam arm 230 to the unlocked position (FIG. 6), the retainer portion 234 is moved out of the lock detent 206.

In the illustrated example, the cam surface 232 on the cam arm 230 is configured to bias the upper frame portion 212 toward the lower frame portion 214 when the cam arm 230 is in the locked position. More specifically, when the cam arm 230 is in the unlocked position (see FIG. 6), the cam surface 232 of the cam arm 230 is out of camming engagement with the upper frame portion 212 which permits the upper frame portion 212 to sufficiently spring apart from the lower frame portion 214 so that the line-receiving passage 215 is established therebetween.

To attach a fishing line 250 to the fishing lure 200, the user first pivots the cam arm 230 to the unlocked position. An end 251 of the fishing line 250 is inserted into a proximal frame opening 216 that is formed in the proximal end of the frame 210 and into the line-receiving passage 215 until the end 251 of the fishing line protrudes out of the body portion 202 adjacent to the proximal most connector portion 218. See FIGS. 5 and 10. Once the user has confirmed that the line 250 has been completely inserted through the line-receiving passage 215 between the upper frame portion 212 and the lower frame portion 214, the user then pivots the cam arm 230 to the locked position shown in FIG. 10. As the cam arm 230 is moved into locked position, the cam surface 232 thereon engages the upper frame portion 212 and moves the upper frame portion 212 toward the lower frame portion 214 thereby securing, pinching, clamping, gripping, and/or retaining the fishing line 250 therebetween (see FIG. 11). The line-coupling arrangement 220 allows the fishing line 250 to be secured, pinched, clamped, gripped, and/or retained over an extended surface area which may improve the holding power of the line-coupling arrangement 220 and may avoid the establishment of discrete and significant local stress points in the line which might compromise the connection. In other words, the fishing line 250 is secured, pinched, clamped, gripped, and/or retained to affix the line 250 to the line-coupling arrangement 220 in an "atraumatic" manner without damaging the line to provide a full strength connection. Other embodiments are envisioned where the upper frame portion 212 and/or the lower frame portion 214 include a tortuous surface comprising teeth, textured surfaces, abraded surfaces, grooves, ridges, etc. to secure, pinch, clamp, grip, and/or retain the fishing line 250 when the cam arm 230 is in the locked position.

Also in the illustrated arrangement, the cam arm 230 is shaped to somewhat closely match an outer contour or outer perimeter 205 of the body portion 202 when the cam arm 230 is in the locked position. Stated another way, the cam arm 230 is largely or substantially received within the cavity 203 in the body portion 202 but for, for example, an end portion 231 of the cam arm 230 which may facilitate movement of the cam arm 230 to the unlocked position when desired. For example, the end portion 231 may be easily engaged with a finger nail or tool to flip or otherwise move the cam arm 230 to the unlocked position. When in the locked position illustrated in FIG. 9, an outer surface 233 of the cam arm 230 substantially matches the outer contour 205 of the body portion 202. In other words, the outer surface 233 of the cam arm 230 is streamlined with the outer contour 205 of the body portion 202 when the cam arm 230 is in the locked position. Thus, when in the locked position, the cam arm 230 does not materially affect the manner in which the lure displaces water as it retrieved through the water. Other variations of the cam arm may include a fin-like protrusion or other protrusions designed to cause desired affects and appearances as the lure is retrieved through the water. A further advantage afforded by this embodiment concerns the relative ease in which the fishing line may be attached to the lure. In this embodiment, the user simply has to pivot the cam arm to the unlocked position and insert the fishing line. This action may be easily accomplished for example when the user's hands are wet and cold.

FIGS. 12-16 illustrate use of another form of a knotless line-coupling arrangement 330 that is configured to attach a fishing line 350 to a fishing implement such as a fishing lure 300, for example. FIG. 14 illustrates the line-coupling arrangement 330 that is configured to connect a shaft, or frame 320, to the fishing line 350. The frame 320 may be attached to, or housed within, the fishing lure 300. As can be seen in FIG. 14, the frame 320 comprises line-gripping members in the form of an upper portion 322 and a lower portion 324 which are configured to spring away from each other or otherwise be spaced from each other. The upper portion 322 and the lower portion 324 are configured to be brought together by the line-coupling arrangement 330 to secure, pinch, clamp, grip, and/or retain the fishing line 350 to affix the lure 300 to the fishing line 350 as described in greater detail below.

Referring to FIGS. 13, 14 and 15, the line-coupling arrangement 330 comprises a threaded shaft 340 and a nut 360. The fishing lure 300 comprises a body portion 302 that includes internal cavities or recesses which are configured to enable the frame 320, shaft 340, and nut 360 to be seated therein. To facilitate such assembly, the body portion 302 may be provided in two or more pieces that may be attached together by appropriate adhesive or mechanical fasteners after the frame 320, the shaft 340, and the nut 360 have been seated therein. More specifically, the nut 360 comprises a boss 364 which is rotatably seated in a proximal recess or cavity 304 in the body portion 302 to prevent distal and proximal movement of the nut 360 when received in the body portion 302. The shaft 340 is seated in a distal recess 306 that is located distal to the proximal recess 304. The shaft 340 defines a shaft axis SA and is translatable along the shaft axis SA. The shaft 340 is constrained within the body portion 302 of the lure 300 to move axially into and out of the threaded engagement with the nut 360 as the user rotates the nut 360. In one arrangement, the shaft 340 is supported for axial and non-rotatable travel within the body portion 302 of the lure 300 by ribbing, or other features, that mate with flat surfaces of the translating shaft 340, thereby preventing rotation, but still allowing axial translation. The shaft 340 comprises external threads 342 that are configured to threadably engage with internal threads 362 of the nut 360. The nut 360 is free to rotate about the shaft axis SA. The distal recess 306 and shaft 340 are sized to prevent the nut 360 and shaft 340 from becoming dis-engaged from one another. The upper portion 322 and the lower portion 324 of the frame 320 extend through the internal diameters of the shaft 340 and the nut 360. As the nut 360 is rotated about the shaft axis SA, the shaft 340 will axially translate along the shaft axis SA to bring the upper portion 322 and lower portion 324 of the frame 320 together as will be described in greater detail below.

To secure the fishing line 350 to the fishing lure 300, a user may thread the fishing line 350 through an opening 368 in the proximal end of the nut 360 and through the internal diameters of the nut 360 and shaft 340. When the line-coupling arrangement 330 is in an open configuration (i.e., a fishing line can be fed into the line-coupling arrangement 330) the shaft 340 is in a distal position and the upper portion 322 and lower portion 324 of the frame are sprung apart as illustrated in FIGS. 13 and 14. As the shaft 340 is advanced proximally by turning the nut 360 clockwise, for example, the shaft 340 will bring the upper portion 322 and the lower portion 324 of the frame 320 together, thereby securing, pinching, clamping, gripping, and/or retaining the fishing line 350 without damaging the line 350, and thereby preventing the establishment of significant local stresses in the line to establish a full strength connection (see FIG. 15). In other words, the fishing line 350 is secured, pinched, clamped, gripped, and/or retained to affix the line 350 to the line-coupling arrangement 330 in an "atraumatic" manner without damaging the line to provide a full strength connection. Further, the nut 360 may comprise a knurled surface 366 which extends proximally beyond the body portion 302 of the lure 300. The knurled surface 366 may aid the user in rotating the nut 360 to secure the line 350 to the lure 300.

FIGS. 17-21 illustrate another knotless line-coupling arrangement 420 that is configured to attach a fishing line 450 to a fishing implement which comprises a fishing lure 400. The fishing lure 400 comprises a body portion 402, a longitudinal slot 404 defined in the body portion 402, a frame 440, and a clamping assembly 430. The frame 440 comprises line-gripping members in the form of an upper portion 444 and a lower portion 442 that are biased or otherwise spaced away from one another and positioned in the longitudinal slot 404. The body portion 402 of the lure 400 may be formed by affixing two halves together, for example. However, other embodiments are envisioned where the body portion 402 is constructed as one unitary piece. In any event, a cavity 406 is defined in the body portion 402 adjacent to the longitudinal slot 404 and is configured to house the clamping assembly 430. The clamping assembly 430, upper portion 444, and lower portion 442, form the line-coupling arrangement 420. The clamping assembly 430 is configured to move the upper portion 444 of the frame 440 toward the lower portion 442 of the frame 440 to secure, pinch, clamp, grip, and/or retain the fishing line 450 therebetween to affix the fishing line 450 to the lure 400 as described in greater detail below.

The clamping assembly 430 comprises an exterior nut 432 that includes a threaded shaft 434 that extends therefrom, an intermediate nut 436 that is threadably engaged with the threaded shaft 434, and a driver nut 438 that extends from the threaded shaft 434. When the exterior nut 432 is rotated, the threaded shaft 434 rotates. The exterior nut 432 is positioned away from the body portion 402 of the lure 400 for access by the user of the lure 400. The intermediate nut 436 is positioned between the exterior nut 432 and the driver nut 438 and is fixed within the cavity 406 of the body portion 402 such that the intermediate nut 436 is not rotatable or movable. The driver nut 438 is positioned between the intermediate nut 436 and the upper portion 444 of the frame 440 and abuts against the upper portion 444 of the frame 440. The driver nut 438 is fixed to the end of the threaded shaft 434 such that the driver nut 438 rotates with the threaded shaft 434 and translates relative to the longitudinal slot 404 as the exterior nut 432 is rotated.

In use, the fishing line 450 is inserted between the upper portion 444 and lower portion 442 of the frame 440 that is positioned in the longitudinal slot 404. When the exterior nut 432 is rotated clockwise, for example, the driver nut 438 will advance toward the upper portion 444 of the frame 440 and move the upper portion 444 of the frame 440 toward the lower portion 442 of the frame 440 to secure, pinch, clamp, grip, and/or retain the fishing line 450 therebetween. This arrangement allows the fishing line 450 to be secured, pinched, clamped, gripped, and/or retained over an extended surface area leaving the line 450 undamaged by preventing the development of significant local stresses in the line 450 at the point of attachment to thereby establish a "full strength" connection. In other words, the fishing line 450 is secured, pinched, clamped, gripped, and/or retained to affix the line 450 to the line-coupling arrangement 420 in an "atraumatic" manner without damaging the line to establish a full strength connection. Other embodiments are envisioned where the upper portion 444 and lower portion 442 comprise teeth, grooves, ridges, abraded surfaces, textured surfaces, and/or other tortious surfaces to secure the fishing line therebetween as discussed herein.

Figure 22:
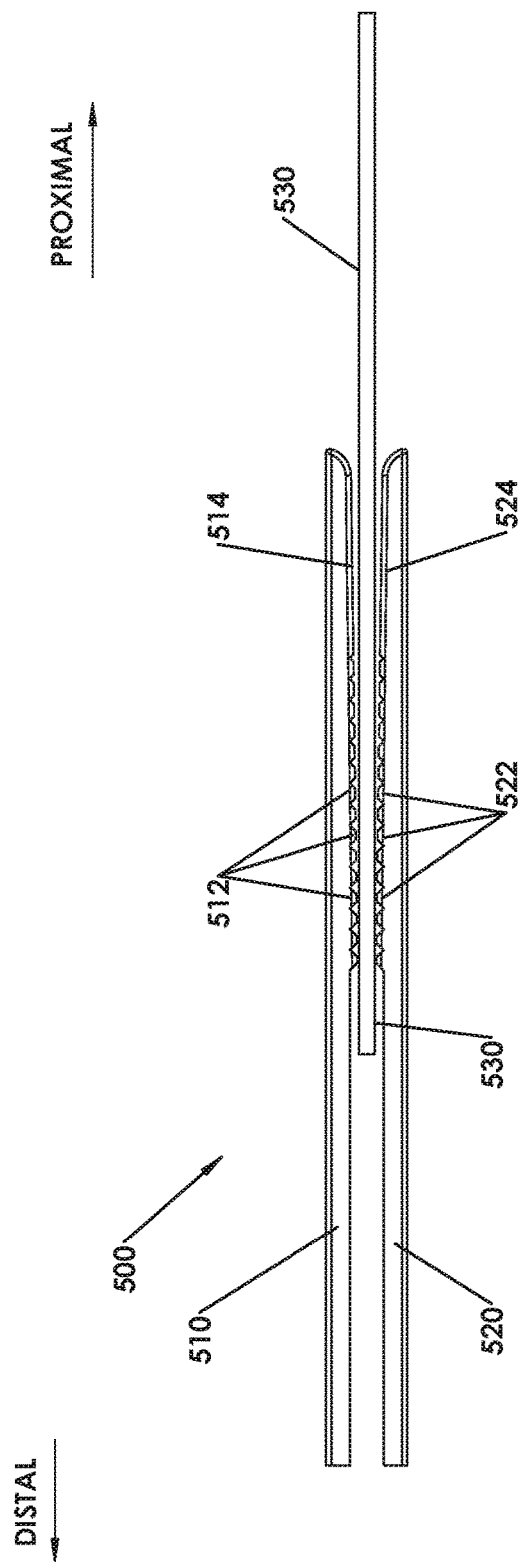
FIG. 22 is a side view of an upper and lower frame portion of a knotless line coupling-arrangement in an open configuration with a fishing line received therein and the frame portions including opposing teeth.
Figure 23:
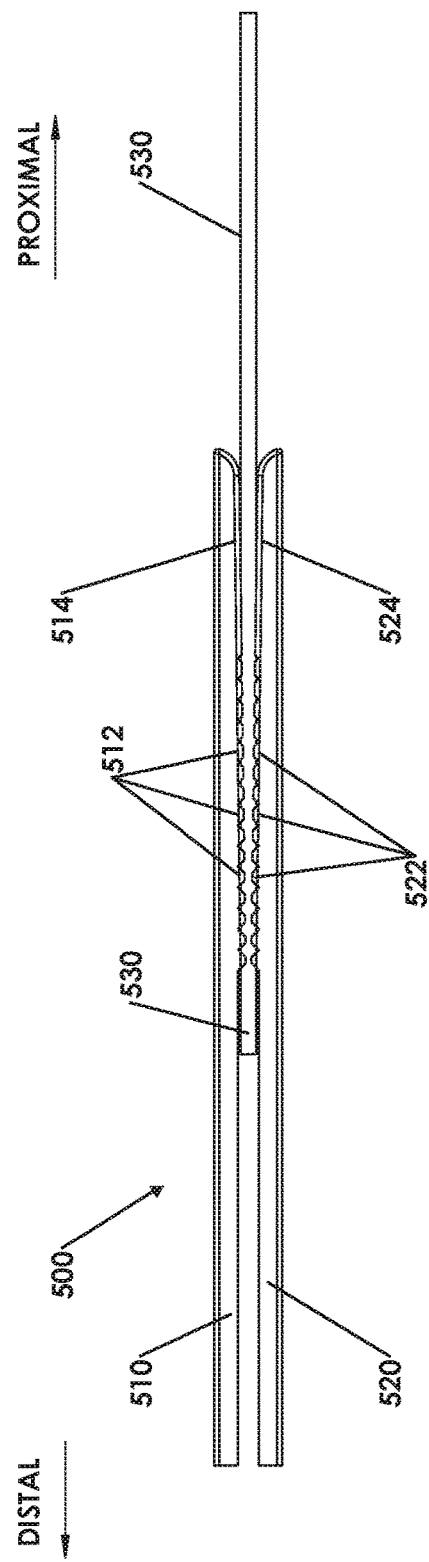
FIG. 23 is a side view of the frame portion of FIG. 22 with the knotless line-coupling arrangement in a closed configuration.
Figure 26:
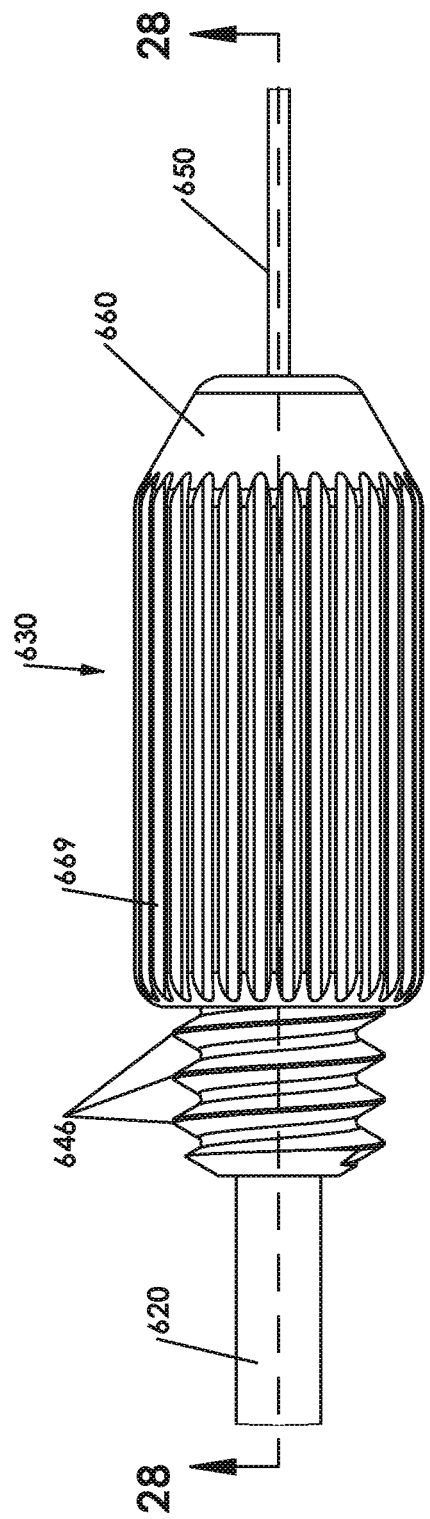
FIG. 26 is a side view of another form of a knotless line-coupling arrangement for attaching fishing line to a shaft of a fishing implement.

Further to the above, FIGS. 22 and 23 illustrate a portion of a frame arrangement or frame configuration 500 that may be alternatively employed in the various fishing implement embodiments disclosed herein. The frame configuration 500 comprises line-gripping members in the form of an upper frame portion 510 and a lower frame portion 520 that are configured to move between an open configuration (see FIG. 22) and a closed configuration (see FIG. 23). In the open configuration, a fishing line 530 can be received between the upper frame portion 510 and the lower frame portion 520. In the closed configuration, the portion of the fishing line 530 received between the upper and lower frame portions 510, 520 is secured, pinched, clamped, gripped, and/or retained to affix the fishing line 530 to the fishing implement in which the frame configuration 500 is supported.

Still referring to FIGS. 22 and 23, the upper frame portion 510 comprises teeth 512 and a proximal smooth portion 514 that are formed one an underside of the upper frame portion 510 so as to face the lower frame portion 520. The teeth 512 are positioned distal to the proximal smooth portion 514. The lower frame portion 520 comprises teeth 522 and a proximal smooth portion 524 that are formed on a topside of the lower frame portion 520 so as to face the upper frame portion 510. The teeth 522 are positioned distal to the proximal smooth portion 524. In the illustrated arrangement, the teeth 512, 522 oppose one another and each tooth 512 on the upper frame portion 510 has the same or similar size and shape of a corresponding tooth 522 on the lower frame portion 520. As can be seen in FIGS. 22 and 23, in at least one embodiment, the teeth 512, 522 are shaped such that the teeth 512, 522 are less aggressive (i.e., flatter and wider) toward the proximal end and more aggressive (i.e., sharper and narrower) toward the distal end. In various embodiments, the teeth 512, 522 may progressively become more aggressive moving from a proximal-most tooth distally through the frame configuration 500. That is, the proximal-most tooth may comprise the least-aggressive tooth on each of the frame portions 510, 520. In this context, the term "least-aggressive" refers to a tooth that has a flatter and wider profile so as to avoid presenting a pointed profile. In one arrangement for example, each tooth moving distally may progressively become more aggressive (i.e., the teeth progressively become sharper and thinner). In some embodiments each corresponding tooth pairs may comprise identical teeth profiles. That is, a tooth on the upper frame portion 510 has an identical profile to a profile of a corresponding tooth on the lower frame portion 520. In still other arrangements a tooth on the upper frame portion 510 may have a profile that is dissimilar (e.g., more aggressive or less aggressive) from a profile of a corresponding tooth on the lower frame portion 520. In still other arrangements, groups of teeth may become more aggressive moving from the proximal portion to the distal portion of the frame configuration 500. For example, a first group of the three proximal-most pairs of teeth (corresponding teeth in the upper and lower frame portions) may have identical profiles that are the least aggressive. The second group of three pairs of teeth may have identical profiles that are somewhat more aggressive than the first group of teeth that are proximal to them. A third group of three pairs of teeth that are distal to the second group of teeth may have identical profiles that are more aggressive than the profiles of the pairs of teeth in the second group and so on. The numbers of teeth in each group as well as the number of groups of teeth may vary from embodiment to embodiment. In still other alternative arrangements, one or both of the proximal smooth portions 514, 524 may be textured or include a textured portion or textured surface.

Positioning the teeth 512, 522 in the above described manners may provide several advantages. More specifically, the discrete local stresses imparted on the fishing line 530 decrease from the proximal end toward the distal end when the upper frame portion 510 and the lower frame portion 520 secure, pinch, clamp, grip, and/or retain the fishing line 530 therebetween. In such an arrangement, for example, should the fishing line 530 initially break in the region with the more aggressive teeth 512, 522, the frame configuration 500 may still remain attached to the fishing line 530 via the less aggressive teeth 512, 522 and/or the smooth portions 514, 524. Further, should the fishing line 530 initially break in the region of the less aggressive teeth 512, 522, the frame configuration 500 may still remain attached to the fishing line 530 via the smooth portions 514, 524. Thus, in at least one arrangement, the frame configuration 500 disclosed herein may form a redundant coupling arrangement for attaching the fishing line 530 to a fishing lure or other fishing implement.

FIGS. 24 and 25 illustrate a portion of another frame arrangement or frame configuration 550 that may be alternatively employed in the various fishing implement embodiments disclosed herein. The frame configuration 550 is similar to frame configuration 500 except for the differences noted below. For example, the frame configuration 550 comprises line-gripping members in the form of an upper frame portion 560 and a lower frame portion 570 configured to move between an open configuration (see FIG. 24) and a closed configuration (see FIG. 25). In the open configuration, a fishing line 530 can be received between the upper frame portion 560 and the lower frame portion 570. In the closed configuration, the fishing line 530 received between the upper and lower frame portions 560, 570 is secured, pinched, clamped, gripped, and/or retained to affix the fishing line 530 to the frame configuration 550.

Further to the above, the upper frame portion 560 comprises teeth 562 and a proximal smooth portion 564 that are formed on an underside of the upper frame portion 560 that faces the lower frame portion 570. The teeth 562 are positioned distal to the proximal smooth portion 564. The lower frame portion 570 comprises teeth 572 and a proximal smooth portion 574 that are formed on a topside of the lower frame portion 570 that faces the upper frame portion 560. The teeth 572 are positioned distal to the proximal smooth portion 574. The teeth 562, 572 may be identical to the teeth 512, 522 described above, however, in this arrangement, the teeth 562 are longitudinally offset from the teeth 572. Thus, each tooth 562 in the upper frame portion corresponds to a space between adjacent teeth 572 in the lower frame portion 570. In other words, the teeth 562 on the upper frame portion 560 and the teeth 572 on the lower frame portion 570 form a tortuous path when the upper and lower frame portions 560, 570 are in the closed configuration. Further, the teeth 562, 572 are shaped such that the teeth 562, 572 are less aggressive (i.e., flatter and wider) toward the proximal end and more aggressive (i.e., sharper and narrower) toward the distal end. As noted above, in alternative embodiments, one or both of the proximal smooth portions 564, 574 may be textured or include a textured portion or textured surface.

Positioning the teeth 562, 572 in the above described manner may provide several advantages. More specifically, the establishment of discrete local stresses in the fishing line 530 decrease from the proximal end toward the distal end when the upper frame portion 560 and the lower frame portion 570 secure, pinch, clamp, grip, and/or retain the fishing line 530 therebetween. In such an arrangement, for example, should the fishing line 530 initially break in the region with the more aggressive teeth 562, 572, the frame configuration 550 may still remain attached to the fishing line 530 via the less aggressive teeth 562, 572 and/or the smooth portions 564, 574. Further, should the fishing line 530 initially break in the region of the less aggressive teeth 562, 572, the frame configuration 550 may still remain attached to the fishing line 530 via the smooth portions 564, 574. Thus, in at least one arrangement, the frame configuration 550 disclosed herein may form a redundant coupling arrangement for attaching the fishing line 530 to a fishing lure or other fishing implement.

In alternative arrangements, either of the frame configurations 500, 550 may be adapted to replace the frame portion 110 in the lure 100 described above. In such alternative arrangements, line 150 would be inserted into the lure body 102 through the proximal opening 116 such that the line passes between the upper frame portion 510, 560 and the lower frame portion 520, 570 with the cam arm 130 in the unlocked position. As was described above, the line 150 may be completely inserted through the body 102 until the end 151 of the line 150 exists the body 102 through the opening 101. Thereafter, the cam arm 130 is moved to the locked position wherein the cam arm clamps the line 150 between the upper frame portion 510, 560 and lower frame portion 520, 570.

Further to the above, in alternative arrangements, either of the frame configurations 500, 550 may be adapted to replace the frame 210 in the lure 200 described above. In such alternative arrangements, line 250 would be inserted into the body portion 202 through an opening such that the line passes between the upper frame portion 510, 560 and the lower frame portion 520, 570 when the cam arm 230 is in the unlocked position. As was described above, the line 250 may be completely inserted through the body portion 202 until the end 251 of the line 250 exists the body portion 202 as shown in FIG. 10. Thereafter, the cam arm 230 is moved to the locked position wherein the cam arm 230 clamps the line 250 between the upper frame portion 510, 560 and lower frame portion 520, 570.

In still other arrangements, the teeth arrangements of the frame configurations 500, 550 may be employed in the frame 320 in the fishing lure 300 described above. In such arrangements, the fishing line 350 would be clamped between the smooth portions 514/524, 564/574 and teeth 512/522, 562/572 when the nut 360 is threaded onto the shaft 340. Likewise, the frame configurations 500, 550 may be adapted for use in the fishing lure 400 and replace portions of the frame 440 therein.

FIGS. 26-29 illustrate another form of a knotless line-coupling arrangement 630 that comprises a nut 660 and a shaft portion 640. The shaft portion 640 defines a shaft axis SA and comprises a distal slot 644 therein that is configured to receive a shaft or wire frame 620 of a fishing hook or fishing implement, as otherwise described herein. See FIG. 28. In at least one arrangement, the frame 620 is received within the distal slot 644 of the shaft portion 640 and attached thereto by, for example, crimping, soldering, brazing, adhesive, etc. The shaft portion 640 further comprises a line-gripping member in the form of a proximally extending collet 642 that includes slots 649 formed therein. See FIG. 27. In the illustrated example, the collet 642 comprises four radial slots 649 that are positioned at 90 degrees relative to the shaft axis SA, however, other embodiments are envisioned with more or less than four slots. The slots 649 may allow the jaws of the collet 642 to flex relative to the shaft axis SA. The collet 642 further comprises camming surfaces 643 on the proximal most end of the collet 642. The camming surfaces 643 are configured to engage the nut 660 to secure the fishing line 650 to the line-coupling arrangement 630 as described in greater detail below.

The collet 642 further comprises a proximal slot 648 which extends proximally from the distal slot 644 and terminates in an opening at the proximal most end of the collet 642. The proximal slot 648 comprises ridges 648a, or teeth, at the distal end thereof and a smooth portion 648b at the proximal end thereof. The smooth portion 648b is tapered away from the shaft axis SA toward the proximal end of the collet 642 which may allow for easier insertion of the fishing line 650 into the proximal slot 648 and to facilitate even securing, pinching, clamping, gripping, and/or retaining of the fishing line 650 without damaging the line 650, thereby preventing the establishment of local stresses in the line 650 and providing a full strength connection as will be described in greater detail below.

Figure 28:
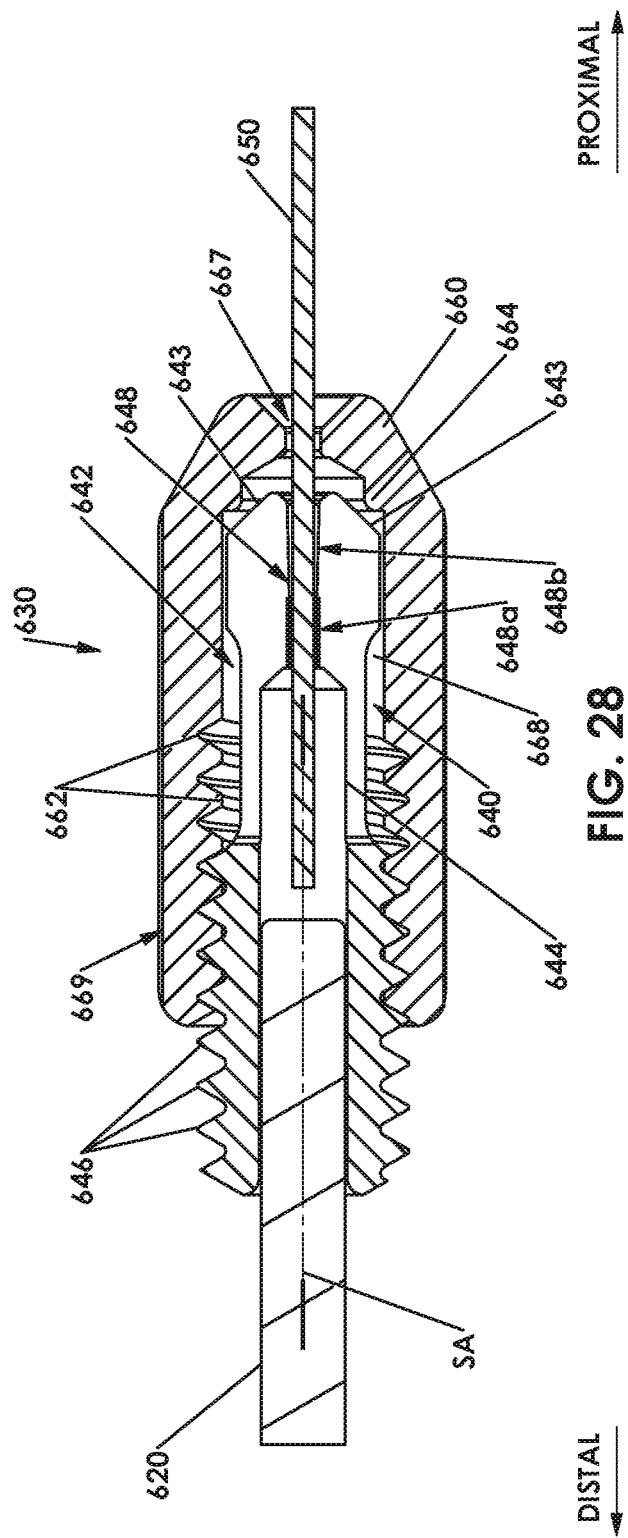
FIG. 28 is a cross-sectional view of the knotless line-coupling arrangement of FIG. 26 taken along line 28-28 in FIG. 26 with the fishing line attached thereto.
Figure 27:
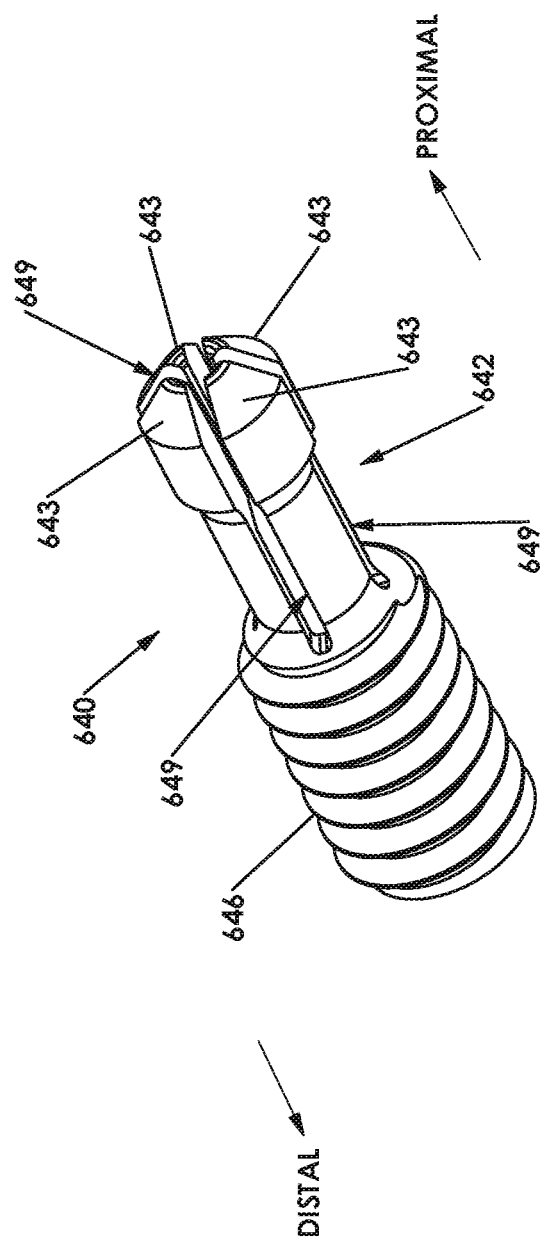
FIG. 27 is a perspective view of a collet of the knotless line-coupling arrangement of FIG. 26.
Figure 29:
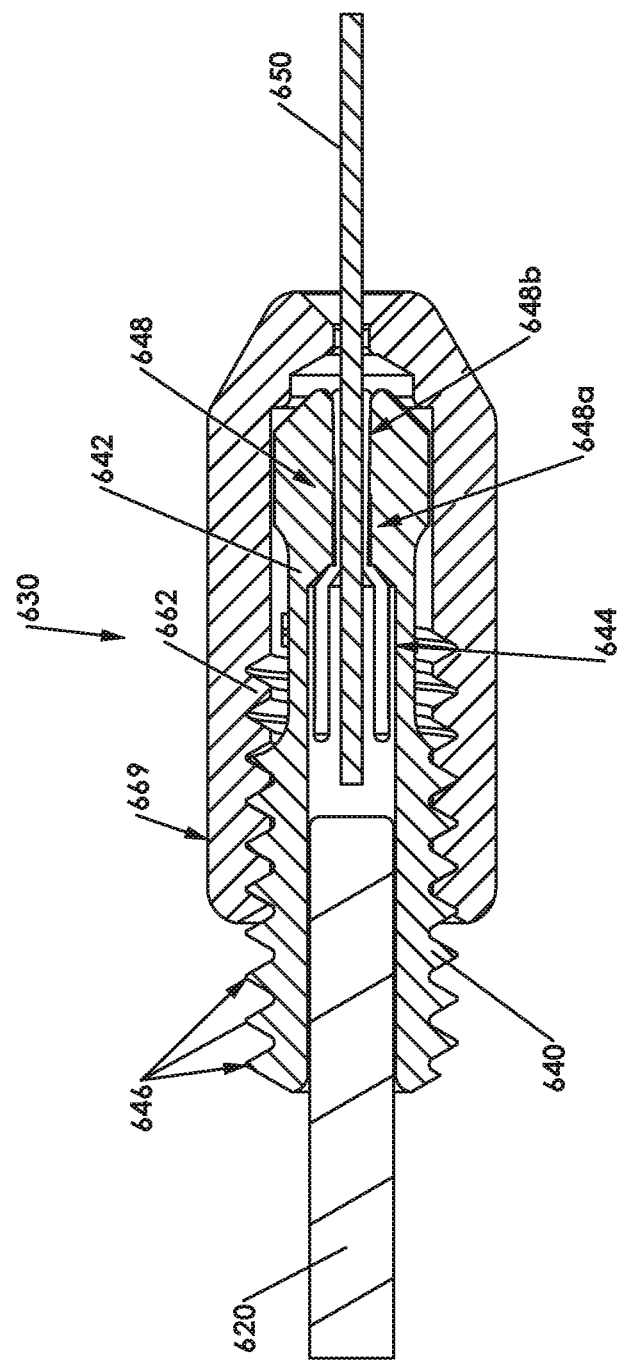
FIG. 29 is another cross-sectional view of the knotless line-coupling arrangement of FIG. 26 after the fishing line has been inserted therein and prior to being attached thereto.

Referring primarily to FIG. 28, an opening 667 is formed in the proximal end of the nut 660. The opening 667 opens into a cavity 668 formed in the nut 660. The nut further includes an internal thread 662 that is located distal to the cavity 668. An annular protrusion 664 extends into the cavity 668 from the body of the nut 660 at a proximal-most end of the cavity 668. The cavity 668 is sized to receive the collet 642 of the shaft portion 640. Further, the internal thread 662 of the nut 660 is configured to threadably engage external threads 646 of the shaft portion 640. The nut 660 may further comprise a knurled outer surface 669 that is configured to assist the user in threading the nut 660 onto the shaft portion 640. The nut 660 and shaft portion 640 may be housed within the body of a fishing lure or fishing implement, for example.

To secure the fishing line 650 to the line-coupling arrangement 630, and thus secure the fishing line 650 to the frame 620 of a fishing implement, a user may begin by threading the nut 660 onto the shaft portion 640 by engaging the internal threads 662 of the nut 660 with the external threads 646 of the shaft portion 640. Once the internal threads 662 and the external threads 646 are substantially engaged, the fishing line 650 is guided through the opening 667 of the nut 660 and through the proximal slot 648. Once the line 650 has been inserted through the opening 667 and the proximal slot 648, the user may continue to rotate the nut 660 relative to the shaft portion 640. As the nut 660 is advanced distally by turning the nut 660 clockwise, for example, the annular protrusion 664 of the nut 660 engages the camming surfaces 643 of the collet 642 and flexes the collet 642 inward toward the shaft axis SA. As the collet 642 flexes inward, the proximal slot 648 will decrease in diameter and thus cinch the fishing line 650 positioned therein, thereby securing, pinching, clamping, gripping, and/or retaining the fishing line 650 without damaging the line 650, thereby preventing the establishment of significant local stresses in the line and providing a full strength connection. In other words, the fishing line 650 is secured, pinched, clamped, gripped, and/or retained to affix the line 650 to the line-coupling arrangement 630 in an "atraumatic" manner without damaging the line to provide a full strength connection. The proximal slot 648 will decrease in diameter a greater amount at the proximal end of the proximal slot 648 as compared to the distal end of the proximal slot 648. However, as discussed above, at least a portion of the proximal slot 648 is tapered away from the shaft axis SA from the distal end of the proximal slot 648 to the proximal end of the proximal slot 648. The smooth portion 648b that is tapered in this manner may at least partially accommodate for any uneven securing, uneven pinching, uneven clamping, and/or uneven gripping of the line 650 by the collet 642.

As discussed above, the proximal slot 648 of the collet 642 comprises ridges 648a, or teeth, and a smooth portion 648b. Positioning the ridges 648a, or teeth, distal to the smooth portion 648b may provide additional advantages. More specifically, the more aggressive pinching, clamping, or gripping surface (i.e., the ridges 648a) may be positioned farther away from the user. In such an arrangement, for example, should the fishing line 650 initially break in the portion of the proximal slot 648 with the ridges 648a, the line-coupling arrangement 630 may still remain attached to the fishing line 650 via the smooth portion 648b of the proximal slot 648. Thus, in at least one arrangement, the proximal slot 648 arrangement disclosed herein may form a redundant coupling arrangement for attaching the fishing line 650 to a fishing lure. However, other arrangements of the proximal slot 648 are contemplated. Further, the various teeth configurations described above with respect to the frame configurations 500, 550 may also be incorporated or otherwise employed in alternative embodiments of collet 642.

Figure 30:
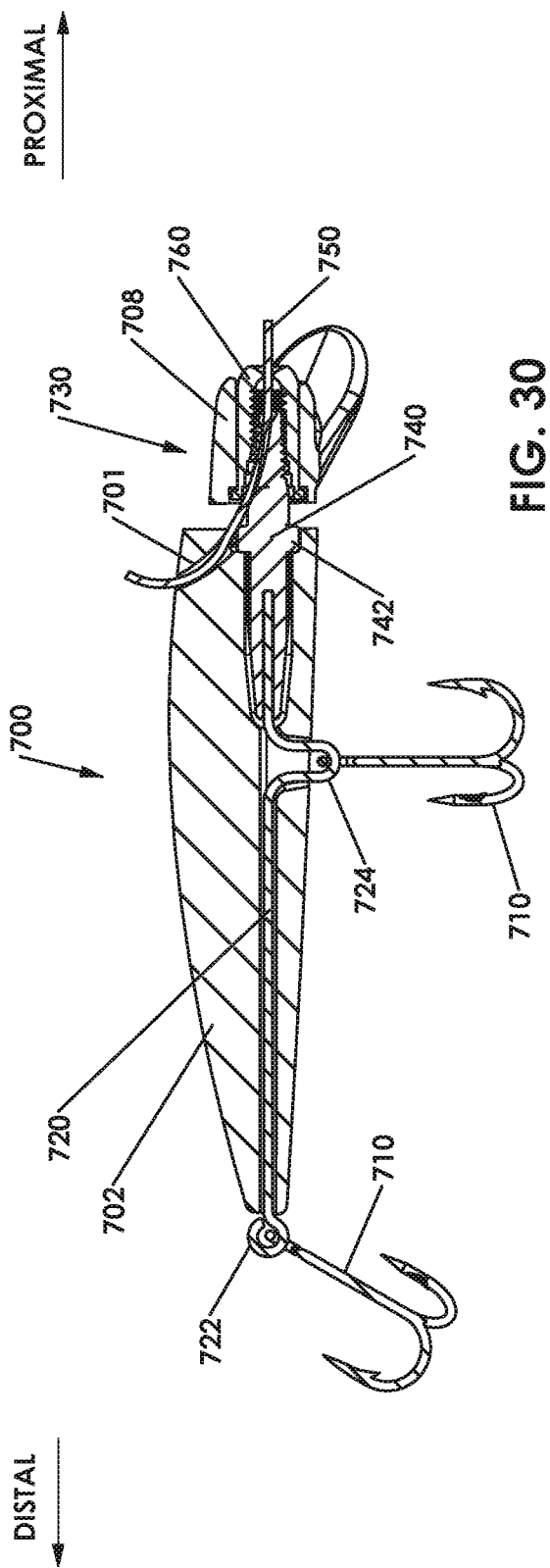
FIG. 30 is a cross-sectional view of another fishing implement during initial insertion of a fishing line into a knotless line-coupling arrangement of the fishing implement.
Figure 31:
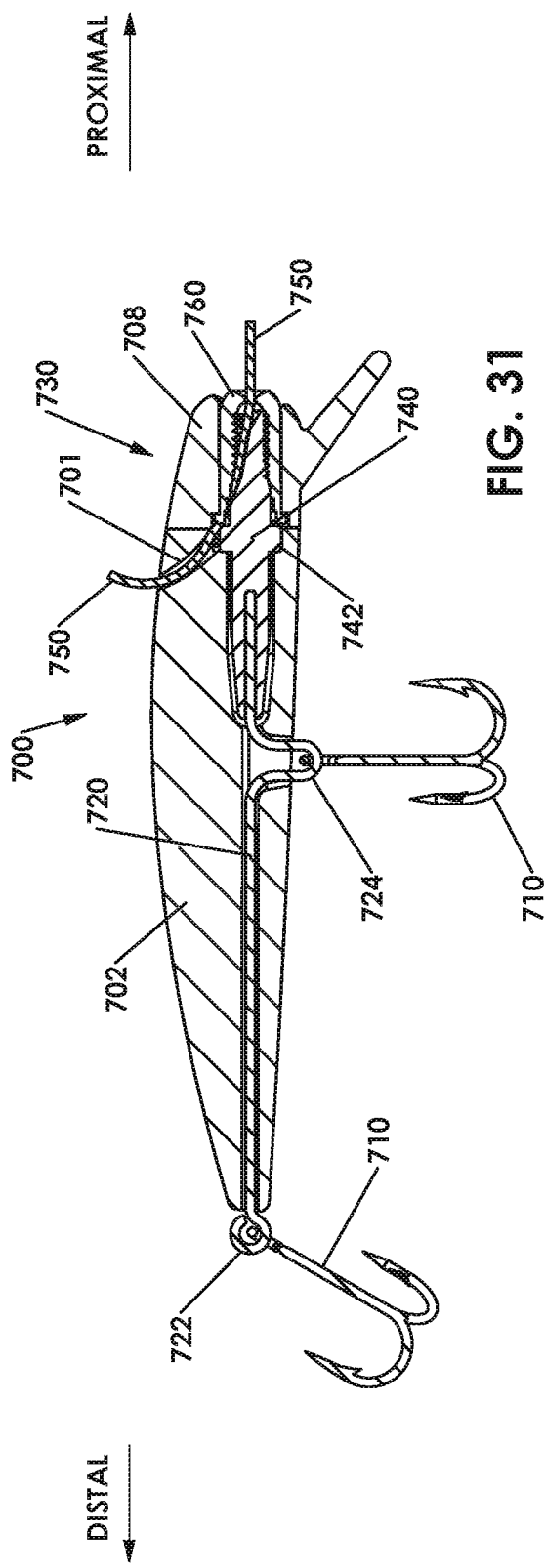
FIG. 31 is a cross-sectional view of the fishing implement and knotless line-coupling arrangement of FIG. 30 after the fishing line has been clamped thereto.

FIG. 30 illustrates a line-coupling adapter 730 configured to connect a shaft, or wire frame 720 of a fishing implement such as fishing lure 700, to a fishing line 750. The wire frame 720 may comprise connector portions 722 and 724 for connecting the wire frame 720 to fishing hooks 710, for example. The wire frame 720 may be attached to, or housed within, the fishing lure 700 as described in greater detail below.

Figure 32:
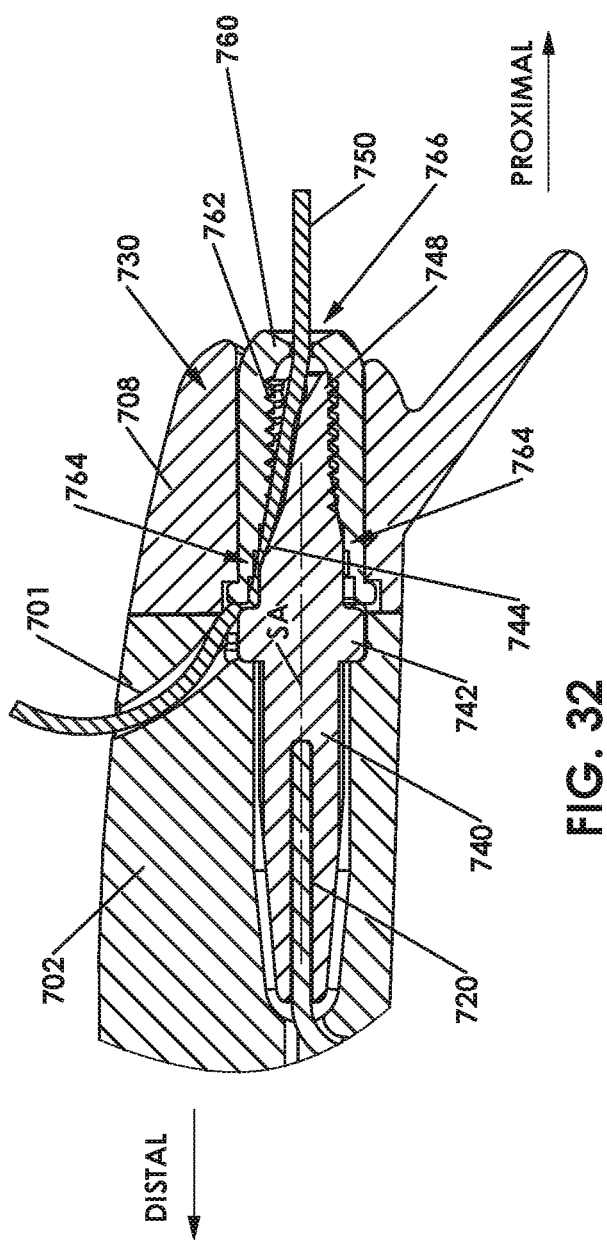
FIG. 32 is an enlarged cross-sectional view of a portion of the fishing implement of FIG. 30 with the knotless line-coupling arrangement clamping the fishing line thereto.
Figure 33:
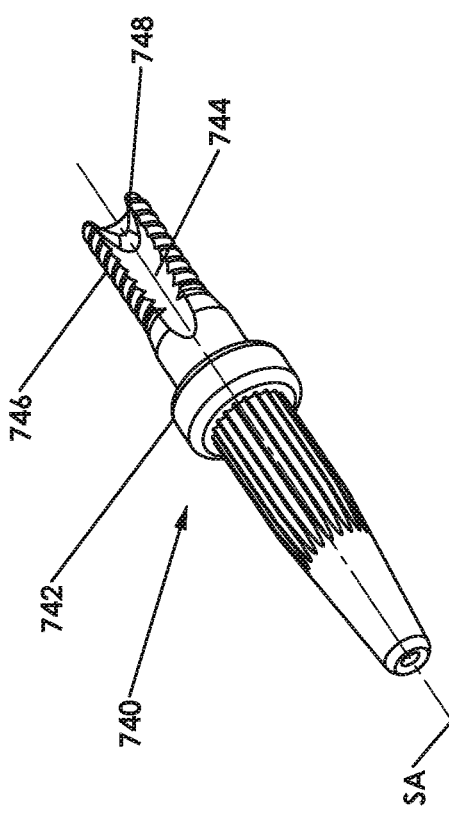
FIG. 33 is a perspective view of a shaft portion of the knotless line-coupling arrangement of FIG. 30.
Figure 39:
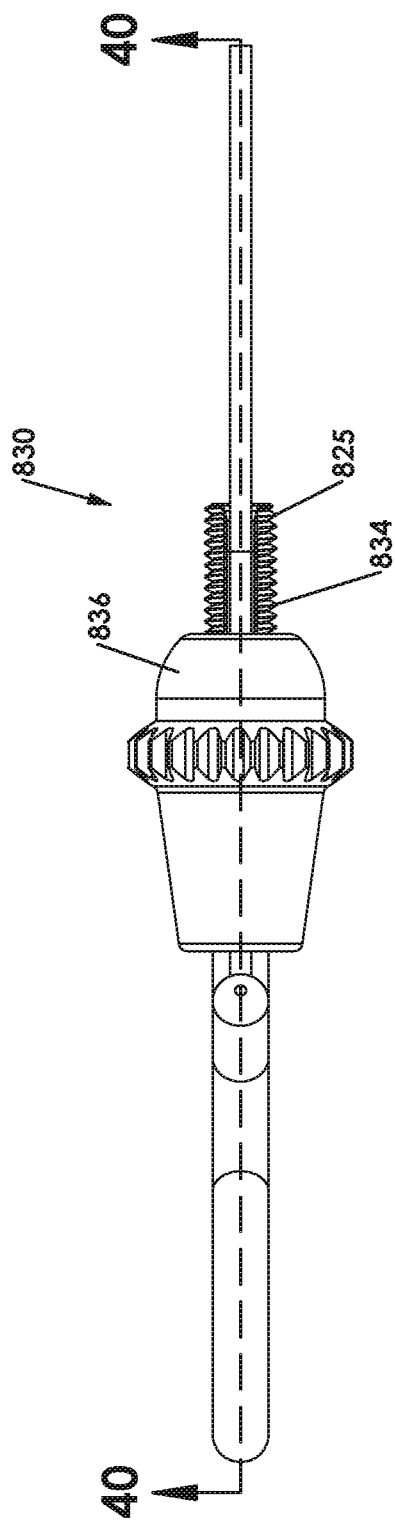
FIG. 39 is another plan view of the knotless line-coupling arrangement of FIG. 36 with a nut and shaft portion of the line-coupling arrangement clamping a portion of a fishing line.

In at least one form, the line-coupling adapter 730 comprises a shaft portion 740 and a nut 760. The shaft portion 740 of the line-coupling adapter 730 is secured to the wire frame 720 and fixed thereto by, for example, crimping, soldering, brazing, adhesive, etc. The fishing lure 700 comprises a body portion 702 that, for ease of assembly, comprises two housing portions (not shown) which are attachable to one another to form the body portion 702. The housing portions may be fabricated from plastic, rubber, wood, metal, etc. and be coupled together by appropriate fastening means such as adhesive, brazing, etc. In alternative forms, the housing portions may be configured to be snapped together with cooperating snap features. In still other configurations, the housing portions may be coupled together with other mechanical fasteners such as screws, bolts, etc. The housing portions comprise internal cavities for accommodating the wire frame 720 and the shaft portion 740 of the line-coupling adapter 730 within the body portion 702 when the housing portions are attached to one another. As can be seen in FIG. 32, the shaft portion 740 comprises a boss 742 configured to be seated in corresponding recesses in the housing portions to prevent distal and proximal movement of the wire frame 720 and shaft portion 740 when received in the body portion 702. The shaft portion 740 further comprises a line-receiving groove 744. In at least one example, the line-receiving groove 744 is tapered relative to a shaft axis SA (See FIG. 32). For example, the line-receiving groove 744 may taper from a proximal or attachment end 748 of the shaft portion 740 toward the boss 742 of the shaft portion 740. As can be seen in FIG. 33, the line-receiving groove 744 opens through a sidewall 741 of the shaft portion 740.

Further to the above, the fishing lure 700 comprises a head portion 708 that is configured to be releasably attached to the body portion 702. The head portion 708 may be fabricated from the same or similar material from which the body portion 702 is fabricated from. In alternative arrangements, the head portion 708 may be fabricated from a dissimilar material to provide the lure 700 with a different appearance and/or different buoyancy characteristics. In one arrangement, the head portion 708 comprises an internal cutout that is configured to receive the nut 760 of the line-coupling adapter 730. The nut 760 may be fixed to the head portion 708 by, for example, crimping, soldering, brazing, adhesive, etc. The nut 760 comprises internal threads 762 (FIG. 32) that are configured to mate with external threads 746 (FIG. 33) of the shaft portion 740 to threadably attach the head portion 708 to the body portion 702 as described in greater detail below.

To secure the fishing line 750 to the fishing lure 700, a user may begin to thread the head portion 708 onto the body portion 702 by engaging the internal threads 762 of the nut 760 with the external threads 746 of the shaft portion 740. Once the internal threads 762 and the external threads 746 are substantially engaged, the fishing line 750 can be guided through a proximal opening 766 of the nut 760 and into the line-receiving groove 744. The fishing line 750 exits the line-receiving groove 744 distal to the nut 760 and enters a body groove 701 defined in the body portion 702 (see FIG. 32). The body groove 701 allows the user to visually confirm that the fishing line 750 has been passed completely through the line-coupling adapter 730. Once the line has been fed through the line-coupling adapter 730, the user may continue to rotate the head portion 708 relative to the body portion 702 to secure the head portion 708 to the body portion 702 as illustrated in FIG. 32. As the nut 760 is advanced distally by turning the head portion 708 clockwise, for example, the nut 760 captures the fishing line 750 between the line-receiving groove 744 and the internal threads 762 of the nut 760, or a smooth distal collar 764 on the nut 760, thereby securing, pinching, clamping, gripping and/or retaining the fishing line 750 therein without damaging the line 750, and thereby preventing the creation of significant local stresses in the line and providing a full strength connection. In other words, the fishing line 750 is secured, pinched, clamped, gripped, and/or retained to affix the line 750 to the line-coupling adapter 730 in an "atraumatic" manner without damaging the line to provide a full strength connection. In at least one example, the distal collar 764 of the nut 760 comprises a stepped profile as illustrated in FIG. 32. The stepped profile aids in the securement of the fishing line 750 when cinched between the nut 760 and the line-receiving groove 744.

Figure 40:
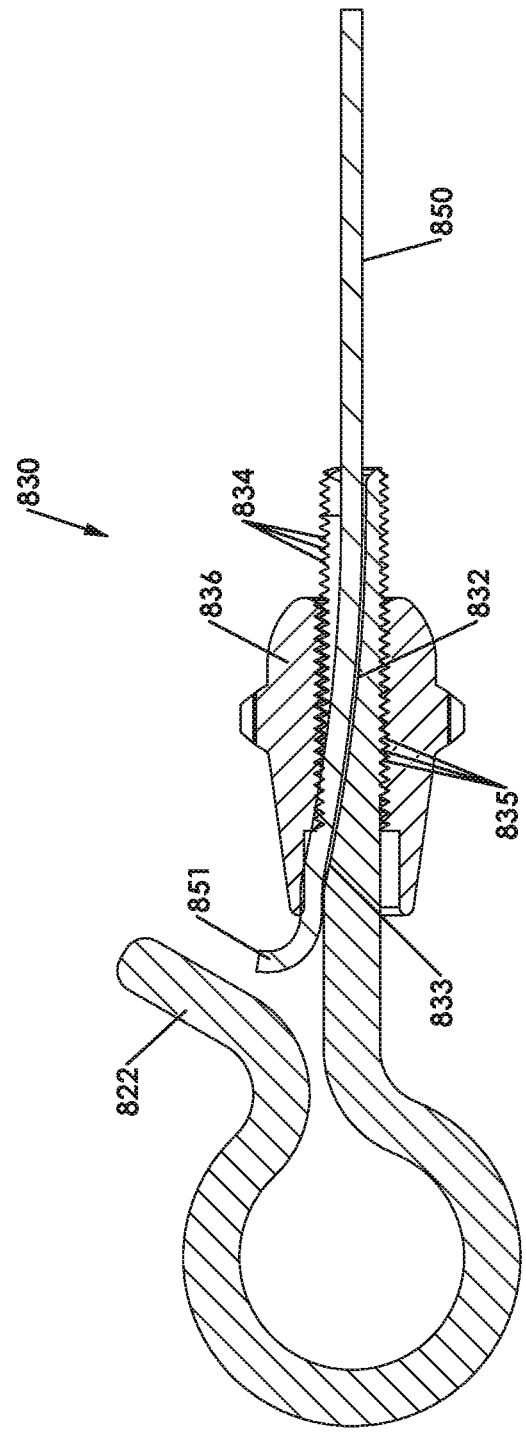
FIG. 40 is a cross-sectional view of the knotless line-coupling arrangement of FIG. 39 taken along line 40-40 in FIG. 39.
Figure 41:
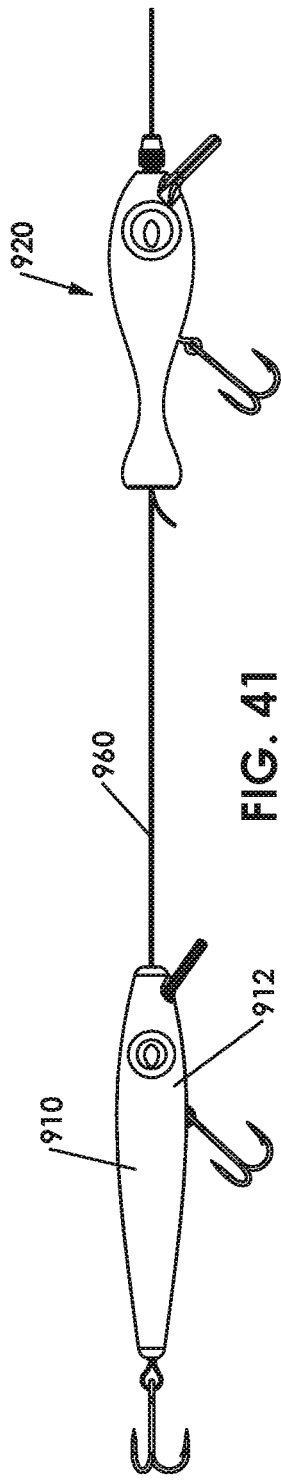
FIG. 41 is a side view of another fishing implement and a lead lure that employs another form of a knotless line-coupling arrangement for attaching a fishing line thereto.
Figure 42:
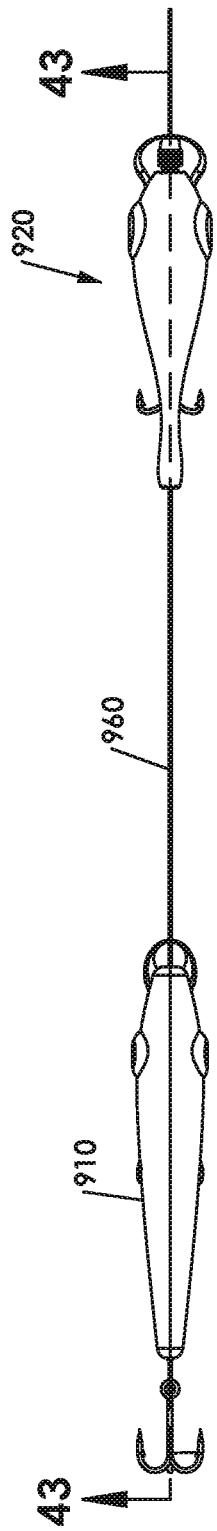
FIG. 42 is a plan view of the fishing implement and lead lure of FIG. 42 taken along line 43-43 in FIG. 42.
Figure 43:
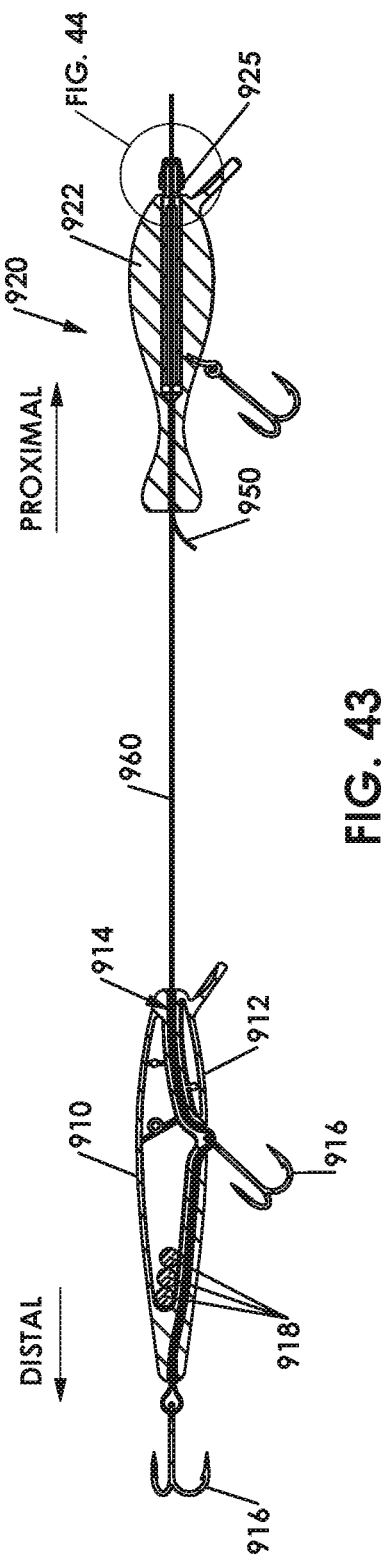
FIG. 43 is a cross-sectional view of the fishing implement and lead lure of FIG. 41 taken along line 43-43 in FIG. 41 during initial installation of a fishing line into the knotless line-coupling arrangement in the lead lure.

FIGS. 36-40 illustrate another knotless line-coupling arrangement 830 for attaching a hook 822 that is configured to be used with another connector such as, for example, a ring or other portion of the implement itself to connect a fishing implement to a fishing line 850. In at least one arrangement, for example, the hook 822 includes a shaft portion 824 that includes a line-receiving groove 832 formed therein. The shaft portion 824 defines a shaft axis SA and further includes a series of threads 834 formed in the portion of the shaft portion 824 that has the line-receiving groove 832 formed therein. The knotless line-coupling arrangement 830 further includes a threaded nut 836 that has internal threads 835 that are configured to threadably engage the threads 834 on the shaft portion 824. In at least one example, the line-receiving groove 832 is tapered relative to the shaft axis SA. For example, the line-receiving groove 832 may taper from a proximal or attachment end 825 of the shaft portion 824 toward a central shaft portion 826 of the shaft portion 824. In the example illustrated in FIG. 36, a distal end 833 of the line-receiving groove 832 may curve and extend through a wall 827 of the central shaft portion 826 to enable the fishing line 850 to extend therethrough. The distal end 833 of the line-receiving groove 832 is exposed when the threaded nut 836 is fully threaded onto the threads 834 as illustrated in FIG. 40.

As previously discussed herein, a distal end 851 of the fishing line 850 is inserted through a hole 838 in the threaded nut 836 and into the line-receiving groove 832 so that the distal end 851 of the fishing line 850 extends out of the distal end 833 of the line-receiving groove 832. The threaded nut 836 is then tightened onto the threads 834 of the shaft portion 824 to cinch the line to the line-coupling arrangement 830. The user may then hook the hook 822 through an eye on the implement or on another attachment clip.

FIGS. 41-48 illustrate another knotless line coupling arrangement comprising a main lure 910, a lead lure 920, and a steel or titanium composite leader 960. The lead lure 920 comprises a body portion 922 and a line-gripping member in the form of a shaft portion 925. The shaft portion 925 comprises a longitudinal slot 926 (FIGS. 44 and 48) configured to receive a fishing line 950 therein. The leader 960 is fixed to the distal end of the lead lure 920 by, for example, crimping, soldering, brazing, adhesive, etc. The leader 960 is positioned within a groove 914 defined within a body portion 912 of the main lure 910. In the illustrated example, the body portion 912 comprises two housing portions which are assembled together around the leader 960. Hooks 916 are attached to the leader 960 and rattle weights 918 are positioned in the body portion 912 of the main lure 910 to enable the lure to rattle as the main lure 910 is drawn through the water.

Figure 44:
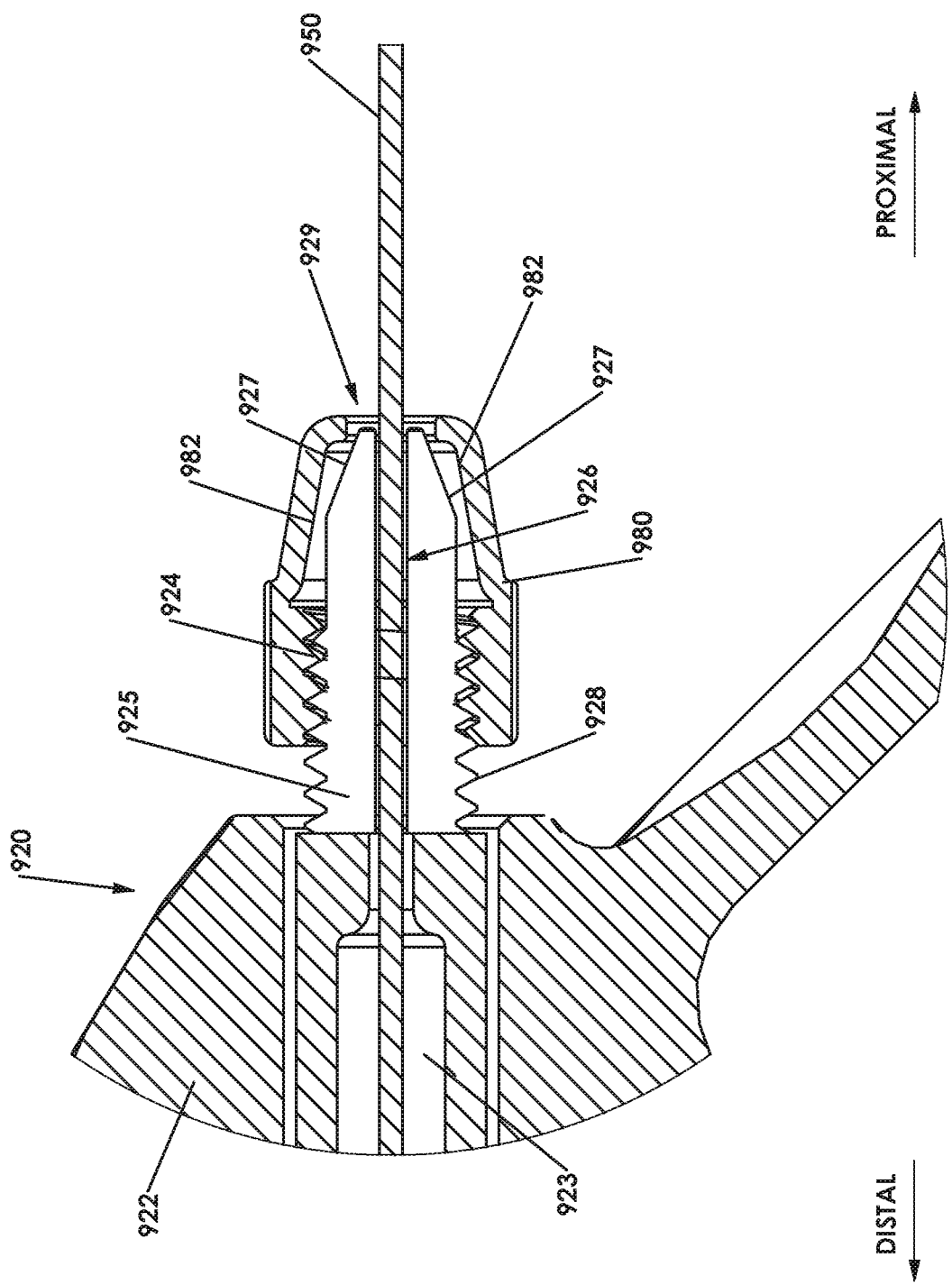
FIG. 44 is an enlarged cross-sectional view of a portion of the lead lure and knotless line-coupling arrangement of FIG. 43.
Figure 48:
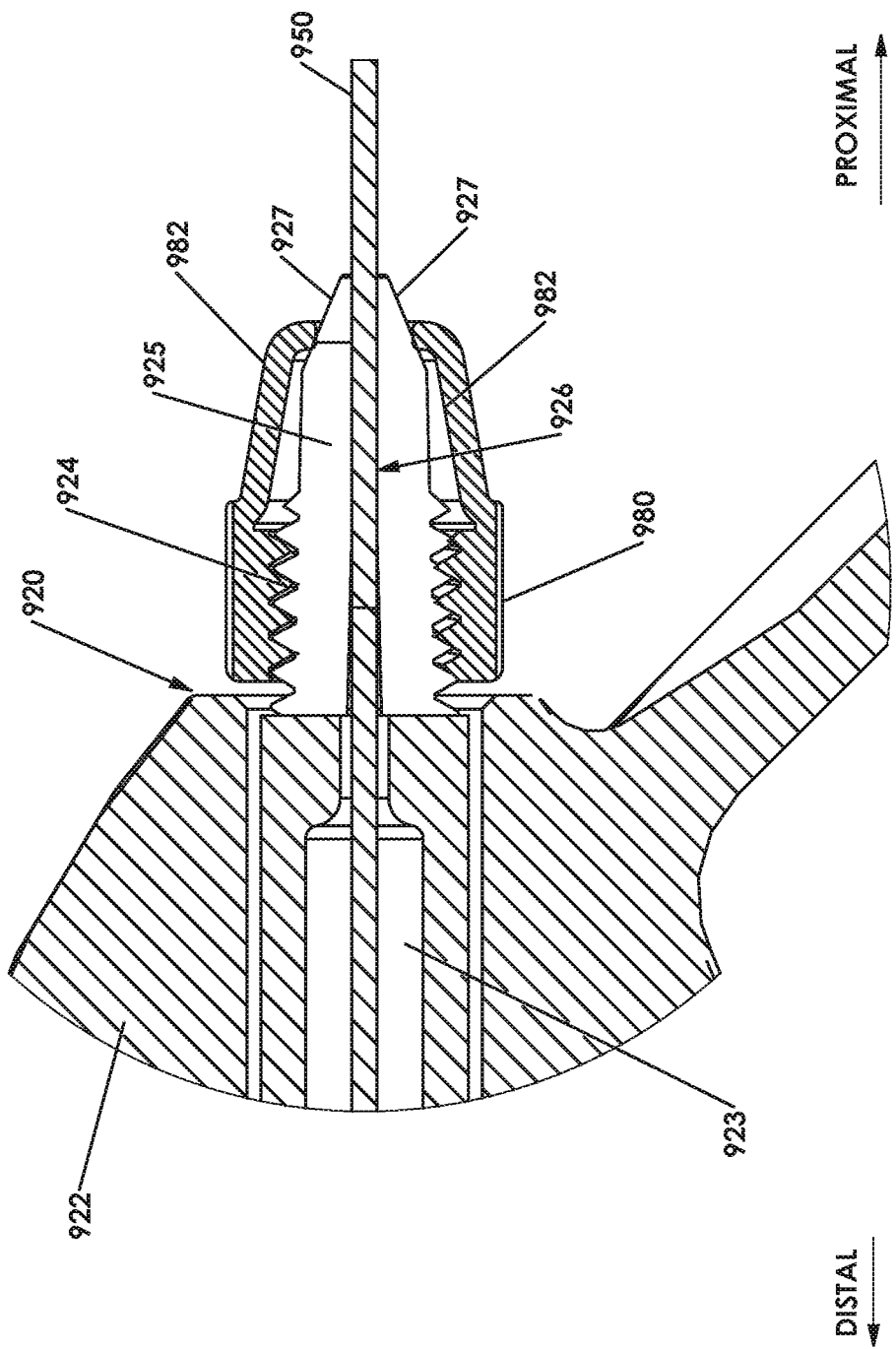
FIG. 48 is an enlarged cross-sectional view of a portion of the lead lure and the knotless line-coupling arrangement of FIG. 47 illustrating a nut of the line-coupling arrangement fully engaged with the lead lure.

Referring primarily to FIGS. 44 and 48, the lead lure 920 is configured to attach the leader 960 to the fishing line 950. The body portion 922 of the lead lure 920 comprises an internal slot 923 that extends along the length of the body portion 922. The shaft portion 925 extends proximally from the body portion 922 of the lead lure 920. The shaft portion 925 comprises external threads 928 configured to threadably engage internal threads 924 of a nut 980. As discussed above, the shaft portion 925 comprises a longitudinal slot 926. The longitudinal slot 926 is further configured to receive the fishing line 950 from its proximal-most end. The shaft portion 925 is formed with slots to allow the shaft portion 925 to flex inwardly, or collapse, similar to the collet 642 illustrated in FIGS. 27 and 28. Further, the nut 980 comprises internal camming surfaces 982 that are configured to engage external camming surfaces 927 defined on the proximal end of the shaft portion 925. When the internal camming surfaces 982 of the nut 980 engage the external camming surfaces 927 of the shaft portion 925, the shaft portion 925 is flexed inward, or collapsed.

To secure the fishing line 950 to the lead lure 920, and thus, to the leader 960, a user may begin to thread the nut 980 onto the shaft portion 925 by engaging internal threads 924 of the nut 980 with the external threads 928 of the shaft portion 925. Once the internal threads 924 and the external threads 928 are substantially engaged, the fishing line 950 can be guided through a proximal opening 929 in the nut 980 and into the longitudinal slot 926 of the shaft portion 925. The fishing line 950 exits the longitudinal slot 926 and enters the internal slot 923 defined in the body portion 922 before exiting the internal slot 923 at the proximal end of the lead lure 920. The internal slot 923 allows the user to visually confirm the fishing line 950 has been passed completely through the lead lure 920. Once the line 950 has been fed through the lead lure 920 the user may continue to rotate the nut 980 relative to the shaft portion 925 to secure the nut 980 to the shaft portion 925. More specifically, as the nut 980 is advanced distally by turning the nut 980 clockwise, for example, the longitudinal slot 926 will collapse to capture the fishing line 950 therein as the internal camming surfaces 982 of the nut 980 engage the external camming surfaces 927 of the shaft portion 925, as discussed above. When the longitudinal slot 926 collapses, the fishing line 950 is thereby secured, pinched, clamped, gripped, and/or retained without damaging the line 950, and thereby preventing any local stress in the line and providing a full strength connection. In other words, the fishing line 950 is secured, pinched, clamped, gripped, and/or retained to affix the line 950 to the lead lure 920 in an "atraumatic" manner without damaging the line to provide a full strength connection. In at least one arrangement, the lead lure components may be fashioned to look like a small fish so that it looks like the larger main lure 910 is chasing the smaller lead lure 920.

FIGS. 49-56 illustrate another knotless line-coupling arrangement 1020 that is configured to attach a fishing line 1050 to a fishing implement or fishing lure 1000. The fishing lure 1000 comprises a body portion 1002, a longitudinal slot 1004 configured to receive the fishing line 1050, a connector 1030 defining a connector axis CA, and a wedge cavity 1006 defined in the body portion 1002. The body portion 1002 may be formed in multiple pieces that are attached together by appropriate adhesive, brazing, screws, snap features, etc. However, other embodiments are envisioned where the body portion 1002 is constructed as one unitary piece. In any event, the wedge cavity 1006 is configured to receive a wedge portion 1032 of the connector 1030. The wedge cavity 1006 may comprise tapered sides which taper away from the connector axis CA as they extend toward the longitudinal slot 1004. Further, the connector 1040 is threadably engaged with the body portion 1002 such that the connector 1030 rotates relative to the body portion 1002 and translates relative to the longitudinal slot 1004. In other words, the wedge portion 1032 can be advanced toward and away from the wedge cavity 1006 depending on the direction the connector 1030 is rotated. The connector 1030 may connect the fishing lure 1000 to a hook 1010 and another connector 1040 may connect the distal end of the fishing lure 1000 to another hook 1010. Other embodiments are envisioned where the connector 1030 does not connect the lure to a hook, but rather, the connector is flush with the outside of the body portion 1002 of the lure 1000 and may be rotated by a user with a tool or an additional implement.

In use, the fishing line 1050 is inserted into the longitudinal slot 1004 and through a passageway in the wedge portion 1032. See FIG. 52. A groove may be provide in the body portion 1002 of the lure 1000 to allow the fishing line 1050 to exit the longitudinal slot 1004 and the body portion 1002 to ensure the user that the fishing line 1050 has been adequately fed through the line-coupling arrangement 1020. As the connector 1030 is rotated clockwise, for example, the wedge portion 1032 will rotate and the fishing line 1050, which is received in the passageway of the wedge portion 1032, will be wrapped around an outer surface 1034 of the wedge portion 1032 as the wedge portion 1032 is advanced toward the wedge cavity 1006. The outer surface 1034 of the wedge portion 1032 may comprise line-receiving grooves to guide the fishing line 1050 around the outer surface 1034 of the wedge portion 1032. As the connector 1030 is rotated further clockwise, for example, the fishing line 1050 may wrap around the wedge portion 1032 several times and the wedge portion 1032 will eventually engage the wedge cavity 1006 preventing further advancement. The fishing line 1050 is secured, pinched, clamped, gripped, and/or retained between the wedge cavity 1006 and the outer surface 1034 of the wedge portion 1032. This arrangement allows the fishing line 1050 to be secured, pinched, clamped, gripped, and/or retained over an extended surface area leaving the line 1050 undamaged by preventing local stress in the line and providing a full strength connection. In other words, the fishing line 1050 is secured, pinched, clamped, gripped, and/or retained to affix the line 1050 to the line-coupling arrangement 1020 in an "atraumatic" manner without damaging the line to provide a full strength connection.

Figure 61:
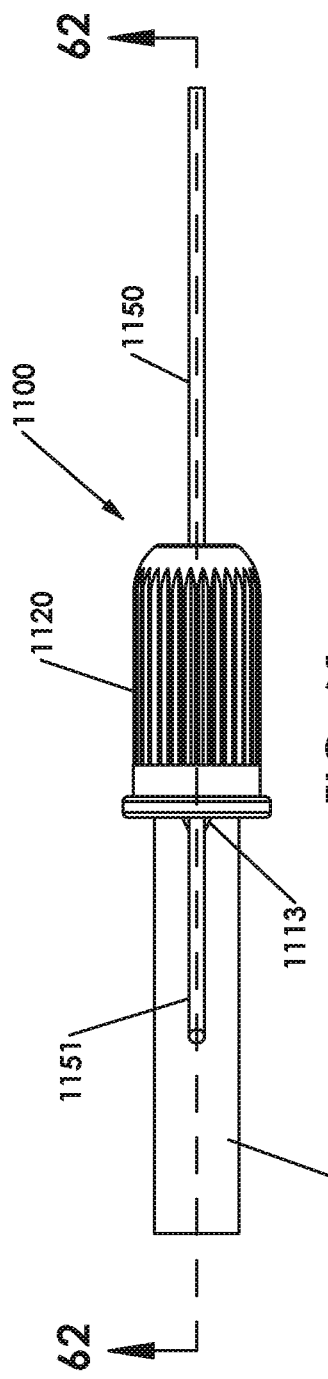
FIG. 61 is another plan view of the knotless line-coupling arrangement of FIG. 57 after the fishing line has been coupled thereto.
Figure 62:
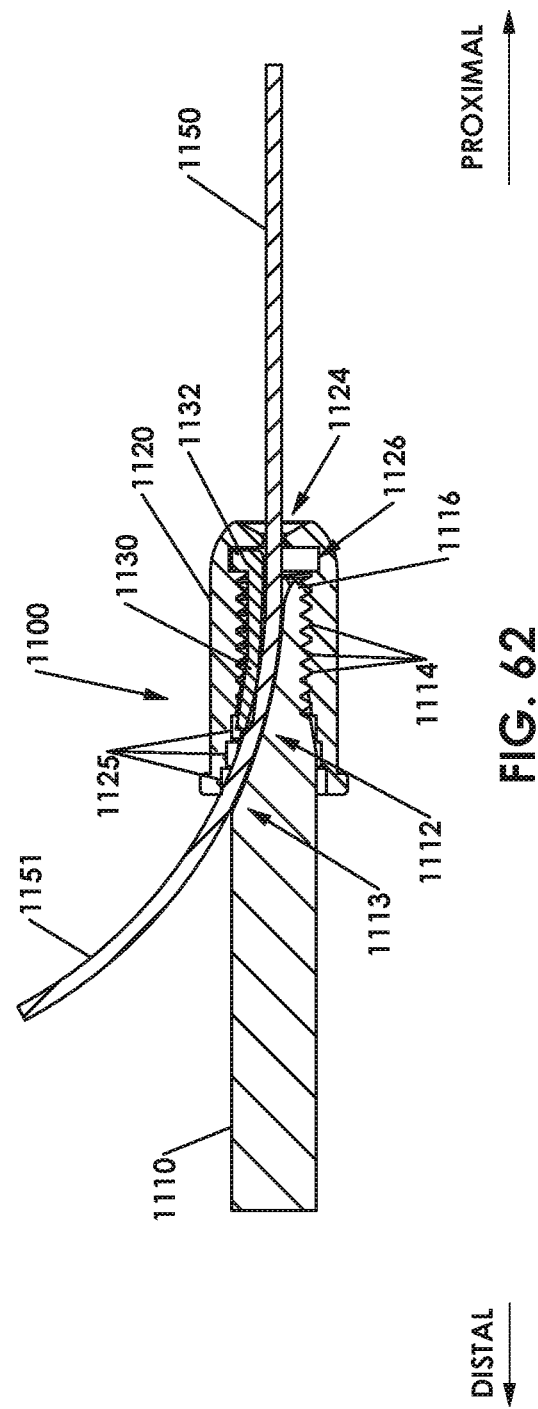
FIG. 62 is a cross-sectional view of the knotless line-coupling arrangement of FIG. 61 taken along line 62-62 in FIG. 61 after the fishing line has been coupled thereto.

FIGS. 57-62 illustrate another knotless line-coupling arrangement 1100 that is configured to attach a fishing line to a fishing implement such as a hook or shaft portion of a fishing implement, for example. In at least one arrangement, for example, the hook or fishing implement includes a shaft portion 1110 defining a shaft axis SA. See FIG. 58. The shaft portion 1110 includes a line-receiving groove 1112 formed therein. The shaft portion 1110 further includes a series of threads 1114 formed in the portion of the shaft portion 1110 that has the line-receiving groove 1112 formed therein. The knotless line-coupling arrangement 1100 further includes a threaded nut 1120 that has internal threads 1122 that are configured to threadably engage the threads 1114 of the shaft portion 1110. In at least one example, the line-receiving groove 1112 is tapered relative to the shaft axis SA. For example, the line-receiving groove 1112 may taper from a proximal or attachment end 1116 of the shaft portion 1110 toward a central shaft portion 1118 of the shaft portion 1110. In the example illustrated in FIG. 58, a distal end 1113 of the line-receiving groove 1112 may curve and extend through a wall 1115 of the central shaft portion 1118 to enable a fishing line 1150 to extend therethrough. The distal end 1113 of the line-receiving groove 1112 is exposed when the threaded nut 1120 is fully threaded onto the threads 1114 of the shaft portion 1110 as illustrated in FIGS. 61 and 62.

Further to the above, the nut 1120 further comprises an internal cutout 1126 in the proximal end of the nut 1120. In at least one embodiment, the internal cutout 1126 extends radially beyond the internal threads 1122 of the nut 1120. The internal cutout 1126 is configured to house a portion of a line-clamping adapter 1130. More specifically, a distal portion 1132 of the line-clamping adapter 1130 is housed within the internal cutout 1126 such that the line-clamping adapter 1130 is retained within the internal diameter of the nut 1120. The line-clamping adapter 1130 is configured to assist in securing, pinching, clamping, gripping and/or retaining the fishing line to the line coupling adapter 1100 as described in greater detail below.

As previously discussed herein, a distal end 1151 of the fishing line 1150 is inserted through a hole 1124 in the threaded nut 1120 and into the line-receiving groove 1112 so that the distal end 1151 of the fishing line 1150 extends out of the distal end 1113 of the line-receiving groove 1112. The threaded nut 1120 is then tightened onto the threads 1114 of the shaft portion 1110 to secure, pinch, clamp, grip, and/or retain the fishing line 1150 between the line-clamping adapter 1130 and the line-receiving groove 1112. In at least one embodiment, the line-clamping adapter 1130 comprises a smooth surface that is configured to secure, pinch, clamp, grip, and/or retain the fishing line between the line-clamping adapter 1130 and the line-receiving groove 1112. However, other embodiments are envisioned where the line-clamping adapter 1130 includes teeth, textured surfaces, abraded surfaces, grooves, ridges, etc. that are configured to secure, pinch, clamp, grip, and/or retain the fishing line 1150 when the nut 1120 is engaged with the shaft portion 1110. In at least one example, the threaded nut 1120 comprises a distal collar 1125 that includes a stepped profile. See FIG. 62. The stepped profile may aid in the securement of the fishing line 1150 when secured or cinched between the threaded nut 1120 and the line-receiving groove 1112.

With regard to certain embodiments disclosed herein, for example, a threaded portion of the proximal shaft of a fish hook or wire frame that can be configured into a lure assembly, also contains a groove having a depth that is tapered relative to the axis of the shaft and threads, through which the fishing line can be inserted. An elongated nut with matching threads is installed onto the threaded shaft, with a portion of the distal groove exposed. Fishing line is inserted directly into the proximal end of the assembly, via the groove in the shaft, and exits via the exposed portion of the groove not covered by the nut, the exit opening located just distal of the threaded nut. As the nut is advanced distally by turning clockwise, the nut tightly captures the distal end of the fishing line between the tapered groove and the nut threads, with the threads or a smooth distal collar on the nut pinching and/or clamping and/or gripping the fishing line to secure the coupling arrangement to the line. The taper may quickly assure a very tight and secure grip of the fishing line, without damaging the proximal portion of the line. Multiple embodiments of the present invention, due to properly placed gripping surfaces and gripping features, more gentle and even distribution of line loads and stresses in critical line gripping areas, and the resulting prevention of acute line stresses, form a connection that is stronger and demonstrably quicker than conventional knot tying techniques for attaching fishing implements to fishing lines. Further, knots form weak points, highly stressed areas, and cross section reductions, wherein the line is more likely to break. The various coupler arrangements of the present invention are proven to eliminate or reduce the tedium, time, and variability of knot tying for all types of fishing implements.

Further, unlike existing arrangements, the line-coupling arrangements disclosed herein may completely eliminate knot tying and the need for snap-clip attachments, which claim to be "knotless" but in fact do require a knot. In addition, unlike current arrangements, there is minimal need for extraneous hardware at the head of the implement, which can spook fish and detract from the genuine life-like appearance of the lure, but which are lost if the line breaks or comes untied.

The invention which is intended to be protected is not to be construed as limited to the particular embodiments disclosed. The embodiments are therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

EXAMPLES

Example 1

A knotless coupler for securing a fishing line to a fishing implement, The knotless coupler comprises a first line-gripping member, a second line-gripping member, and a passageway. The first line-gripping member comprising a first line-gripping surface. The first line-gripping surface comprises a plurality of teeth. The second line-gripping member comprising a second line-gripping surface opposing the first line-gripping surface. The passageway is defined between the first line-gripping surface and the second line-gripping surface. The passageway is configured to receive the fishing line. The first line-gripping member and the second line-gripping member are configured to secure the fishing line to the knotless coupler when the passageway is collapsed.

Example 2

The knotless coupler of Example 1, wherein the second line-gripping surface comprises a textured surface.

Example 3

The knotless coupler of Examples 1 or 2, wherein the plurality of teeth comprises a first plurality of teeth, and wherein the second line-gripping surface comprises a second plurality of teeth.

Example 4

The knotless coupler of Example 3, wherein the second plurality of teeth are longitudinally offset from the first plurality of teeth.

Example 5

The knotless coupler of Examples 2 or 3, further comprising an opening configured to receive the fishing line after the fishing line is fed through the passageway, wherein the opening permits the fishing line to exit the fishing implement to be externally visible to a user of the knotless coupler after the fishing line has been fed through the knotless coupler.

Example 6

The knotless coupler of Example 5, wherein the second plurality of teeth are longitudinally offset from the first plurality of teeth.

Example 7

The knotless coupler of Examples 2 or 3, wherein at least one of the first line-gripping member and the second line-gripping member is movable relative to the other of the first line-gripping member and the second line-gripping member between an open position and a closed position, and wherein the passageway is collapsed when the first line-gripping member and the second line-gripping member are in the closed position.

Example 8

The knotless coupler of Example 7, further comprising a cam lever movable between an unlocked position and a locked position, wherein the cam lever is configured to move the first line-gripping member and the second line-gripping member toward the closed position when the cam lever is moved toward the locked position.

Example 9

The knotless coupler of Example 8, wherein the second plurality of teeth are longitudinally offset from the first plurality of teeth.

Example 10

The knotless coupler of Example 7, further comprising a clamping assembly including an adjustable screw, wherein the adjustable screw is configured to move the first line-gripping member and the second line-gripping member between the open position and the closed position.

Example 11

The knotless coupler of Example 10, wherein the second plurality of teeth are longitudinally offset from the first plurality of teeth.

Example 12

The knotless coupler of Example 7, wherein the first line-gripping member and the second line-gripping member comprise a collet, wherein the collet is movable between an expanded configuration and a collapsed configuration, and wherein the first line-gripping member and the second line-gripping member are in the closed position when the collet is in the collapsed configuration.

Example 13

The knotless coupler of Example 12, wherein the second plurality of teeth are longitudinally offset from the first plurality of teeth.

Example 14

The knotless coupler of Example 7, further comprising a hollow shaft configured to translate between a proximal position and a distal position, wherein the first line-gripping member and the second line-gripping member are positioned within an inner diameter of the hollow shaft, and wherein the hollow shaft is configured to move the first line-gripping member and the second line-gripping member toward the closed position when the hollow shaft is moved toward the proximal position.

Example 15

The knotless coupler of Example 14, wherein the second plurality of teeth are longitudinally offset from the first plurality of teeth.

Example 16

A knotless line-coupling arrangement for securing a fishing line to a fishing implement. The knotless line-coupling arrangement comprises a coupler. The coupler comprises a proximal end, a distal end, a first line-gripping member, a second line-gripping member, a passageway, and an attachment formation configured to attach the coupler to the fishing implement. The first line-gripping member comprises a first line-gripping surface extending from the proximal end toward the distal end. The second line-gripping member opposes the first line-gripping member. The second line-gripping member comprises a second line-gripping surface positioned distal to the first line-gripping surface. The second line-gripping surface is more aggressive than the first line-gripping surface. The passageway is defined between the first line-gripping surface and the second line-gripping surface. The first line-gripping member and the second line-gripping member are configured to secure the fishing line to the coupler when the passageway is collapsed.

Example 17

The knotless line-coupling arrangement of Example 16, wherein one of the first line-gripping surface and the second line-gripping surface is movable relative to the other of the first line-gripping surface and the second line-gripping surface between an open position and a closed position, and wherein the passageway is collapsed when the first line-gripping surface and the second line-gripping surface are in the closed position.

Example 18

The knotless line-coupling arrangement of Example 17, wherein the first line-gripping member and the second line-gripping member comprise a collet, wherein the collet is movable between an expanded configuration and a collapsed configuration, and wherein the first line-gripping surface and the second line-gripping surface are in the closed position when the collet is in the collapsed configuration.

Example 19

A knotless coupler for securing a fishing line to a fishing implement. The knotless coupler comprises a shaft portion and a nut. The shaft portion is configured to be attached to the fishing implement. The shaft portion comprises a plurality of external threads and an external line-receiving groove formed across at least some of the external threads. The nut is configured to be threadably engaged with the external threads of the shaft portion. The nut is movable between a non-gripping position and a line-gripping position. A portion of the fishing line may be inserted through an opening in the nut and into the external line-receiving groove when the nut is in the non-gripping position. The portion of the fishing line is secured within the external line-receiving groove by the nut when the nut is in the line-gripping position.

Example 20

The knotless coupler of Example 19, wherein the nut comprises a non-threaded nut portion, and wherein the portion of the fishing line is secured between the external line-receiving groove and the non-threaded nut portion when the nut is in the line-gripping position.

Example 21

The knotless coupler of Examples 19 or 20, further comprising a wedge member positioned between the external line-receiving groove of the shaft portion and internal threads of the nut, wherein the portion of the fishing line is secured between the wedge member and the external line-receiving groove when the nut is in the line-gripping position.

Example 22

A knotless coupler for securing a fishing line to a fishing implement. The knotless coupler comprises a first line-gripping member, a second line-gripping member, and a passageway. The first line-gripping member comprises a first line-gripping surface. The first line-gripping surface comprises a textured surface. The second line-gripping member comprises a second line-gripping surface opposing the first line-gripping surface. The passageway is defined between the first line-gripping surface and the second line-gripping surface. The passageway is configured to receive the fishing line. The first line-gripping member and the second line-gripping member are configured to secure the fishing line to the knotless coupler when the passageway is collapsed.

Example 23

The knotless coupler of Example 22, wherein the textured surface comprises a first textured surface, and wherein the second line-gripping surface comprises a second textured surface.

Example 24

The knotless coupler of Examples 22 or 23, further comprising an opening configured to receive the fishing line after the fishing line is fed through the passageway, wherein the opening permits the fishing line to exit the fishing implement to be externally visible to a user of the knotless coupler after the fishing line has been fed through the knotless coupler.

Example 25

The knotless coupler of Examples 22, 23, or 24, wherein at least one of the first line-gripping member and the second line-gripping member is movable relative to the other of the first line-gripping member and the second line-gripping member between an open position and a closed position, and wherein the passageway is collapsed when the first line-gripping member and the second line-gripping member are in the closed position.

Example 26

The knotless coupler of Example 25, further comprising a cam lever movable between an unlocked position and a locked position, wherein the cam lever is configured to move the first line-gripping member and the second line-gripping member toward the closed position when the cam lever is moved toward the locked position.

Example 27

The knotless coupler of Example 25, further comprising a clamping assembly including an adjustable screw, wherein the adjustable screw is configured to move the first line-gripping member and the second line-gripping member between the open position and the closed position.

Example 28

The knotless coupler of Example 25, wherein the first line-gripping member and the second line-gripping member comprise a collet, wherein the collet is movable between an expanded configuration and a collapsed configuration, and wherein the first line-gripping member and the second line-gripping member are in the closed position when the collet is in the collapsed configuration.

What is claimed is:

1. A fishing implement configured to be secured to a fishing line, wherein the fishing implement comprises:
   a shaft portion configured to be attached to the fishing implement, wherein said shaft portion comprises:
   a plurality of external threads; and
   an external line-receiving groove formed across at least some of said external threads;
   a wire frame comprising a fish hook, wherein said wire frame is affixed to said shaft portion; and
   a nut configured to be threadably engaged with said external threads of said shaft portion, wherein said nut is movable between a non-gripping position and a line-gripping position, wherein a portion of the fishing line is inserted through an opening in said nut and into said external line-receiving groove when said nut is in said non-gripping position, and wherein the portion of the fishing line is secured within said external line-receiving groove by said nut when said nut is in said line-gripping position.

2. The fishing implement of claim 1, wherein said nut comprises a non-threaded nut portion, and wherein the portion of the fishing line is secured between said external line-receiving groove and said non-threaded nut portion when said nut is in said line-gripping position.

3. The fishing implement of claim 1, further comprising a wedge member positioned between said external line-receiving groove of said shaft portion and internal threads of said nut, wherein the portion of the fishing line is secured between said wedge member and said external line-receiving groove when said nut is in said line-gripping position.

4. coupler fishing implement of claim 1, wherein the shaft portion and nut are comprised of plastic.

5. A fishing implement configured to be secured to a fishing line, wherein the fishing implement comprises:
a body portion;
an elongate shaft portion attached to said body portion, wherein said elongate shaft portion comprises:
a plurality of external threads; and
an external line-receiving groove formed across a portion of said external threads;
a wire frame comprising a fish hook, wherein said wire frame is affixed to said elongate shaft portion; and
a nut configured to be threadably engaged with said external threads of said elongate shaft portion, wherein said nut is movable between a non-gripping position and a line-gripping position, wherein a portion of the fishing line is inserted through an opening in said nut and into said external line-receiving groove of said elongate shaft portion when said nut is in said non-gripping position, and wherein the portion of the fishing line is secured between said nut and said external line-receiving groove when said nut is moved toward said line-gripping position.

6. The fishing implement of claim 5, wherein the fishing implement is comprised of plastic.

7. A fishing implement configured to be secured to a fishing line, wherein the fishing implement comprises:
a shaft portion comprising:
a boss;
a plurality of external threads located proximal to said boss; and
an external line-receiving groove formed across at least some of said external threads, and wherein said fishing implement further comprises:
a wire frame comprising at least one fish hook, wherein said wire frame is affixed to said shaft portion; and
a nut configured to be threadably engaged with said external threads of said shaft portion, wherein said nut is movable between a non-gripping position and a line-gripping position, wherein a portion of the fishing line is inserted through an opening in said nut and into said external line-receiving groove when said nut is in said non-gripping position, and wherein the portion of the fishing line is secured within said external line-receiving groove and is retained between a distal end of said nut and said boss when said nut is in said line-griping position.

8. The fishing implement of claim 7, wherein said nut comprises:
a nut body defining a proximal end and said distal end, wherein said opening extends through said proximal end, and wherein said distal end defines a nut flange that is configured to retain the portion of the fishing line between said boss and said nut flange; and
internal nut threads configured to threadably engage said external threads.

9. The fishing implement of claim 7, wherein said boss is unthreaded.

10. The fishing implement of claim 7, wherein said shaft portion further comprises an elongate distal shaft portion extending distally from said boss, wherein said wire frame comprises a distal frame end that protrudes distally from said elongate distal shaft portion.

11. The fishing implement of claim 10, wherein a distal fish hook is coupled to a distal frame end.

12. The fishing implement of claim 11, further comprising a body received on said elongate distal shaft portion.

13. The fishing implement of claim 12, wherein said body is completely proximal to said distal fish hook.

14. The fishing implement of claim 13, further comprising a proximal fish hook coupled to said wire frame, wherein said proximal fish hook is located between said distal fish hook and said nut.

15. The fishing implement of claim 12, wherein said body is configured to attract fish.

16. The fishing implement of claim 12, wherein said nut is housed within a head portion.

17. The fishing implement of claim 16, wherein said body is fabricated from a body material and wherein said head portion is fabricated from a head material that is dissimilar from said body material and configured to alter a buoyancy of said fishing implement.

* * * * *